United States Patent
deVette

(10) Patent No.: US 6,718,141 B1
(45) Date of Patent: Apr. 6, 2004

(54) NETWORK AUTODISCOVERY IN AN ALL-OPTICAL NETWORK

(75) Inventor: Jim Adrian deVette, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/472,124

(22) Filed: Dec. 23, 1999

(51) Int. Cl.[7] .............................................. H04B 10/08
(52) U.S. Cl. ...................... 398/82; 370/225; 370/218; 370/254; 709/223; 398/9; 398/34; 398/75
(58) Field of Search .............................. 359/127, 128, 359/124; 370/254, 225, 218, 219, 220, 221; 709/223; 398/82, 9, 75, 34

(56) References Cited

U.S. PATENT DOCUMENTS

| | | | | |
|---|---|---|---|---|
| 5,289,302 A | * | 2/1994 | Eda .............................. | 359/123 |
| 5,513,029 A | | 4/1996 | Roberts ....................... | 359/177 |
| 5,978,115 A | * | 11/1999 | Condict et al. ............. | 359/110 |
| 6,118,936 A | * | 9/2000 | Lauer et al. ................ | 370/244 |
| 6,335,810 B1 | * | 1/2002 | Uehara ........................ | 359/127 |
| 2002/0051284 A1 | * | 5/2002 | Takatsu et al. ........... | 359/341.1 |

* cited by examiner

Primary Examiner—Leslie Pascal
Assistant Examiner—David C. Payne

(57) ABSTRACT

Optical networks using wavelength division multiplexing (WDM) techniques require innovative methods of maintaining network connectivity data and for identifying and isolating network faults. The present invention discloses such methods using a signal processor for installation at each node for retrieving upstream connectivity data from an out-of-band signal, updating the data and returning it to the out-of-band signal for use by downstream elements. A central network monitor periodically requests updates from each node of the connectivity data maintained by it in the form of messages transmitted along the out-of-band signal. When the various payload signals carried along the network are modulated with in-band signals carrying data which identifies the source and wavelength of the payload, this data can be combined with the updated connectivity data to identify network faults and raise alarms for transmission along the out-of-band signal to the central network monitor. The central network monitor can use the connectivity data and fault isolation alarms to direct its operations, analysis and maintenance functions. Signal formats for the out-of-band signal and apparatus including the node signal processor and the central network monitor for implementing the disclosed methods are also disclosed.

33 Claims, 17 Drawing Sheets

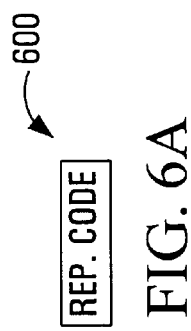

NETWORK AUTODISCOVERY IN AN ALL-OPTICAL NETWORK

FIELD OF THE INVENTION

This invention relates to optical transmission systems in general and specifically to fibre optic networks employing wavelength division multiplexing.

BACKGROUND OF THE INVENTION

Telecommunications network service providers have attempted to keep pace with the exponential increase in demand for telecommunications bandwidth by relying on optical fibre digital networks.

Since 1990, the North American long distance infrastructure has been based on an optical fibre backbone known as SONET (Synchronous Optical NETwork). SONET payloads are time division multiplexed (TDM) digital signals. In North America, OC-48 optical fibres have been used, capable of supporting a SONET signal format of up to STS-48, operating at a maximum bit rate of 2.4 Gbit/s. Each OC-48 fibre is able to support approximately 32,000 simultaneous telephone calls, or 48 channels operating at the maximum electrical transmission digital signal DS-3. The current technology now supports the use of OC-192 fibres having four times the capacity of OC-48 fibres.

More recently, a technique known as wavelength division multiplexing (WDM) has been proposed to significantly increase bandwidth along the optical fibre backbone already installed. WDM involves the introduction of more than one carrier signal within a single optical fibre. These carrier signals are identified by a defining wavelength in the range of 1540 nm to 1610 nm during which the OC-48 fibre has a minimal loss characteristic. The signals are presently separated from neighbouring signals on either side by plus or minus 0.15 nm. In long-haul networks, the signals are divided into two bands, typically denoted Blue (1540 nm to 1555 nm) and Red (1555 nm to 1570 nm) respectively to provide bi-directional transmission capability. In metropolitan WDM networks, duplicate sets of fibres may be used to provide bi-directional transmission capability. Each carrier signal may be modulated by digital data at up to STS-48 data rates. In the case of dense WDM (DWDM) systems, there may be as many as 32 separate channels per fibre, although this number will increase as the technology continues to improve.

While solving the problem of bandwidth availability, at least for the present, WDM presents a significant challenge to the network service provider in terms of determining the physical connectivity of the network for the purposes of maintenance, fault isolation, network-fill usage, performance monitoring and protection readiness.

First, the WDM network necessarily entails an increase in the complexity of the network topology which is proportionate to the increase in traffic capacity of such networks over non-WDM optical networks and even electrical communications networks.

Second, network topology has conventionally been charted by manual datafilling techniques, that is, additions to, deletions from or other modifications to the existing network topology were recorded manually at the network's central office. Even with non-WDM networks, such techniques were frequently characterized by inaccuracy due to errors in the manual keying of the connectivity data and obsolescence since the manually entered data can become easily out of date as the physical fibre connections are constantly changed. Not infrequently, a correct and up to date topology was not recorded until all or part of the network failed and the topology was manually retraced during the repair effort. Moreover, manual datafilling is an expensive and time-consuming endeavour.

Third, because optical networks are inherently transparent to the embedded payload signal, any payload could in theory be carried along the network without extensive hardware redeployment when the service is changed. This same transparency characteristic means that the network service provider is unable to accurately monitor the signal connectivity of the network, even with an accurate topology of the various network elements or nodes.

The challenges are even more significant in identifying and isolating faults along the network. Fault isolation and repair necessarily requires a detailed and accurate record of the network topology, which, as indicated above, is not often available when manual datafilling methods are used to maintain network connectivity data. More significantly, the increased traffic capacity and the transparency of WDM optical networks with regard to signal connectivity render obsolete such traditional fault isolation techniques as manual signal tracing and require the development of new techniques to identify and isolate network faults.

SUMMARY OF THE INVENTION

It is therefore desirable to provide a WDM network with the capability of determining the network's physical topology and signal connectivity in an automated and ongoing manner.

It is also desirable to provide a WDM network with the capability of fault isolation in an automatic and ongoing manner.

It is further desirable to provide a WDM network where individual nodes can detect the connectivity of incoming optical signals and based on their own internal connectivity, broadcast downstream the new signal connectivity.

The invention may be summarized according to a broad aspect as a wavelength division multiplexed (WDM) network having a plurality of network nodes interconnected by WDM compatible optical fibre segments which carry a plurality of WDM compatible wavelengths capable of being modulated by signals, comprising: a configuration propagation system for propagating configuration data of each network node along the network; and a mapping processor for monitoring and processing the configuration data of each network node whereby the configuration for the entire network may be determined.

The invention may be summarized according to a second broad aspect as for use in a WDM network having a plurality of network nodes interconnected by WDM compatible optical fibre segments which carry a plurality of WDM compatible wavelengths capable of being modulated by signals, a configuration signal processor associated with at least one of the network node for generating configuration data, and mapping processor for determining the configuration of the entire network, a configuration signal containing the configuration data for modulating a WDM compatible configuration wavelength reserved throughout the network, whereby the configuration signal processor of a network node may insert configuration data into the configuration signal and the mapping processor may retrieve the configuration data from the configuration signal and determine the configuration of the entire network.

The invention may be summarized according to a third broad aspect as for use in a WDM network having a plurality of network nodes interconnected by WDM compatible optical fibre segments which carry a plurality of WDM compatible wavelengths a capable of being modulated by signals, a configuration signal containing configuration data for modulating a WDM compatible configuration wavelength reserved throughout the network, and a mapping processor for determining the configuration of the entire network,a configuration signal processor associated with a network node for generating configuration data and inserting the configuration data into the configuration signal, whereby the mapping processor may retrieve the configuration data for each network node from the configuration signal and determine the configuration of the entire network.

The invention may be summarized according to a fourth broad aspect as for use in a WDM network having a plurality of network nodes interconnected by WDM compatible optical fibre segments which carry a plurality of WDM compatible wavelengths capable of being modulated by signals, a configuration signal processor associated with at least one of the network nodes for generating configuration data and a configuration signal containing configuration data for modulating a WDM compatible configuration wavelength reserved throughout the network,a mapping processor for retrieving and processing the configuration data for each network node from the configuration signal,whereby the configuration for the entire network may be determined.

The invention may be summarized according to a fifth broad aspect as, for use in a WDM network having a plurality of network nodes interconnected by WDM compatible optical fibre segments which carry a plurality of WDM compatible wavelengths capable of being modulated by signals, a fault processor associated with at least one of the network nodes for generating fault data, and a fault isolation processor for monitoring and processing the fault data of each network node,a fault signal containing the fault data for modulating a WDM compatible fault wavelength reserved throughout the network, whereby the fault processor of a network node may insert fault data into the fault signal and the fault isolation processor may retrieve the fault data from the fault signal and identify and isolate faults in the entire network.

The invention may be summarized according to a sixth broad aspect as for use in a WDM network having a plurality of network nodes interconnected by WDM compatible optical fibre segments which carry a plurality of WDM compatible wavelengths capable of being modulated by signals, a fault signal containing fault data for modulating a WDM compatible fault wavelength reserved throughout the network, and a fault isolation processor for monitoring and processing the fault data of each network node,a fault processor associated with a network node for generating fault data and inserting the fault data into the fault signal, whereby the fault isolation processor may retrieve the fault data for each network node from the fault signal and isolate faults in the entire network.

The invention may be summarized according to a seventh broad aspect as for use in a WDM network having a plurality of network nodes interconnected by WDM compatible optical fibre segments which carry a plurality of WDM compatible wavelengths capable of being modulated by signals, a fault processor associated with at least one of the network nodes for generating fault data and a fault signal containing fault data for modulating a WDM compatible fault wavelength reserved throughout the network,a fault isolation processor for retrieving and processing the fault data for each network node from the fault signal, whereby faults in the entire network may be isolated.

The invention may be summarized according to an eighth broad aspect of a method of determining the configuration of a WDM network having a plurality of network nodes interconnected by WDM compatible optical fibre segments which carry a plurality of WDM compatible wavelengths capable of being modulated by signals and a mapping processor, comprising the steps of: at least one of the nodes determining its configuration; each of the at least one nodes reporting its configuration data to the mapping processor; and the mapping processor determining the overall configuration of the network from the configuration data received from the at least one nodes.

The invention may be summarized according to a ninth broad aspect as a method of determining the configuration of a WDM network having a plurality of network nodes interconnected by WDM compatible optical fibre segments which carry a plurality of WDM compatible wavelengths capable of being modulated by signals, comprising the steps of: reserving one of the WDM compatible wavelengths along the network; a first network node modulating the reserved wavelength on a fibre segment with which it is connected to a second network node with an out-of-band signal describing the in-band signals borne on the other wavelengths along the fibre segment; the first network node transmitting the out-of-band signal together with the in-band signals along the fibre segment from the first node to the second node; and the second network node reviewing the out-of-band signal received along the fibre segment and determining what in-band signals were transmitted along the fibre segment.

The invention may be summarized according to a tenth broad aspect as a method of determining the configuration of a WDM network having a plurality of network nodes interconnected by WDM compatible optical fibre segments which carry a plurality of WDM compatible wavelengths capable of being modulated by in-band signals, a configuration signal containing configuration data for modulating a WDM compatible configuration wavelength reserved throughout the network, configuration signal processors associated with each network node for generating configuration data specific to its associated network node, and a mapping processor for determining the configuration of the entire network, comprising the steps of: the mapping processor inserting a node-to-node message in the configuration signal; the configuration wavelength propagating the node-to-node message in the configuration signal to each network node immediately downstream of the network node; upon receipt of the node-to-node message in the configuration signal at a network node, the configuration signal processor associated with the network node: retrieving the configuration data reported by the immediately upstream configuration signal processor from the node-to-node message in the configuration signal; calculating the effect of its associated network node on the configuration data reported by the immediately upstream configuration signal processor; formatting the configuration data of its associated network node into a node-to-node message; and inserting the node-to-node message into the configuration signal; the mapping processor inserting a request message into the configuration signal; the configuration wavelength propagating the request message in the configuration signal to each network node in the network in turn; upon receipt of the request message in the configuration signal at a network node, the configuration signal processor associated with the network node: generating a reporting message containing the configuration data of its associated network node; and inserting each reporting message into the configuration signal; the configuration wavelength propagating the reporting messages in the configuration signal to the mapping processor; and upon receipt of one of the reporting messages in the configuration signal, the mapping means updating its network configuration data in accordance with the configuration data contained in the reporting message.

The invention may be summarized according to a eleventh broad aspect as a node for connection, in a WDM network which comprises a mapping processor, to a plurality of other nodes by wavelength division multiplexed (WDM) compatible optical fibre segments which carry a plurality of WDM compatible wavelengths capable of being modulated by signals and a configuration signal containing configuration data, comprising: a configuration signal processor for generating configuration data specific to its associated node and inserting the configuration data into the configuration signal, whereby the mapping processor may retrieve the configuration data from the configuration signal and determine the configuration of the node within the network.

BRIEF DESCRIPTION OF THE DRAWINGS

The preferred embodiment of the present invention will now be described with reference to the accompanying drawings in which:

FIG. 4 is a diagrammatic representation of an OSC node-to-node message for conveying upstream wavelength source information to the adjacent downstream node in accordance with an embodiment of the present invention;

FIG. 6(a) is a diagrammatic representation of a node connectivity request message issued by the central network monitor, in accordance with an embodiment of the present invention;

FIG. 6(b) is a diagrammatic representation of a node connectivity report message issued in response to the message of FIG. 6(a) in accordance with an embodiment of the present invention;

FIG. 7(a) is a diagrammatic representation of a first data memory at the central network monitor for maintaining connectivity information relating to the network in accordance with an embodiment of the present invention;

FIG. 7(b) is a diagrammatic representation of a second data memory at the central network monitor for use in conjunction with the data memory of FIG. 7(a);

DETAILED DESCRIPTION OF THE PREFERRED EMBODIMENT

Figure 1:
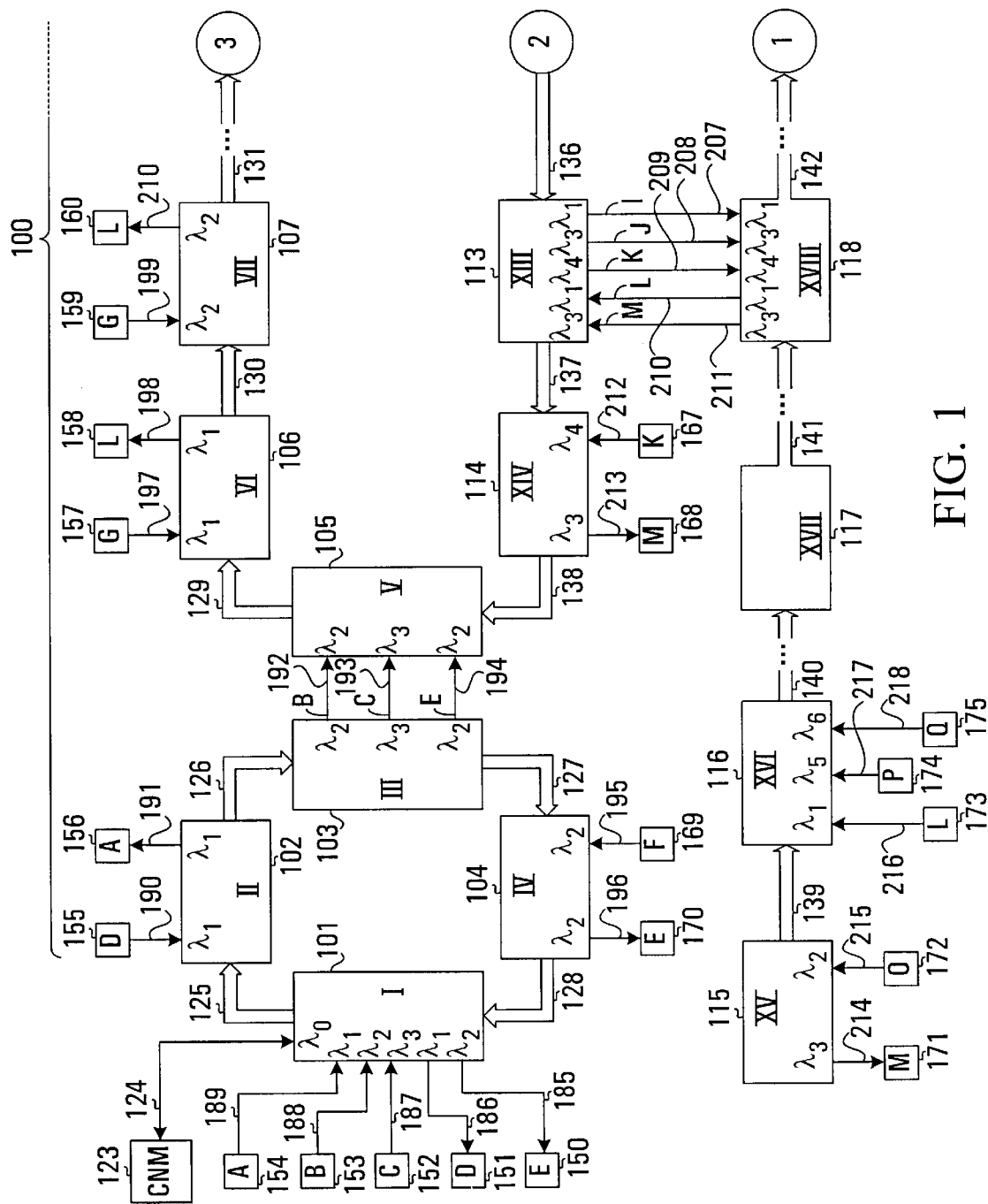
FIG. 1 is a block diagram of the physical topology and signal connectivity of a typical WDM network.
Figure 1:
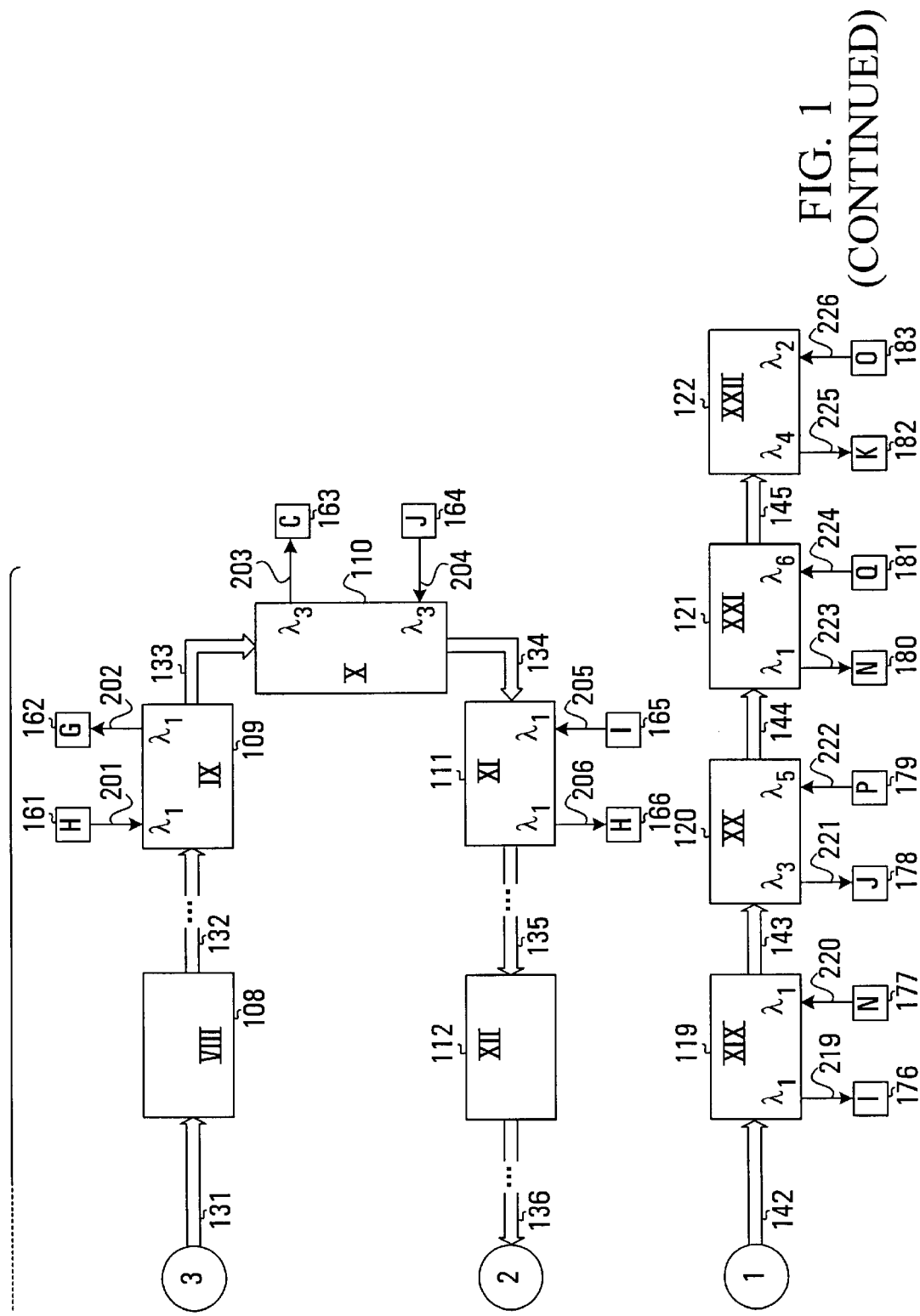

FIG. 1 discloses a block diagram of a typical metropolitan WDM network denoted generally as 100, comprising at least two network nodes 101–122 (often referred to as shelves), at least two line termination equipment (LTE) nodes 150–183 and a central network monitor (CNM) 123.

In the example of FIG. 1, network node. 101–104 form a four-node ring, network nodes 105–114 form a 10-node ring and network nodes 115–122 form an eight-node linear Add-Drop Multiplexer (ADM).

Pairs of nodes 101–122 in a WDM network 100 are interconnected by optical fibre segments 125–145 extending between them. In certain cases, pairs of nodes 103, 105, 113, 118 are interconnected by one or more signal lines 192–194, 207–211. Each node 101–122 is connected to zero or more LTEs 150–183 by a signal line 185–191, 195–206, 212–226, which may be electrical cables or optical fibres such as OC-48 fibres. One of the nodes 101 is connected to the CNM 123 by a communications link 124, which may be an ethernet cable.

Each LTE 150–183 is connected to one of the nodes 101–122 by one of the signal lines 185–226. Each LTE 150–183 is also connected to a telecommunications network (not shown) such as SONET.

The signal lines 185–226 and the segments 125–145 are uni-directional, with the direction of light propagation shown by the arrow terminating one end of the signal line or segment.

In practice, most telecommunications services require bi-directional communications. In a long-haul network, a band of available wavelengths is typically reserved for transmission in one direction and a second band of available wavelengths is reserved for transmission in the opposite direction. In a metropolitan network, such as shown in FIG. 1, a complementary network comprising nodes, segments, LTEs and signal lines but with light propagating in the opposite direction is typically installed. Conventionally, the corresponding nodes from the two complementary networks are located in physical proximity to one other and may share certain processing features such as OSC processing as described below. For purposes of clarity of FIG. 1, the complementary network has been omitted.

By convention, those segments extending away from any particular node 101–122 in the direction of light propagation are referred to as downstream segments and those segments extending from the node in the opposing direction are referred to as upstream segments. Similarly, that portion of the network 100 extending from one of the nodes in the direction of light propagation is considered downstream from the node and that portion of the network extending from it in the opposing direction is considered upstream from the node.

Each node 101–122 accepts a WDM signal from its immediately upstream nodes along its upstream segments 125–145 and transmits a WDM signal to its immediately downstream nodes along its downstream segments.

A WDM signal comprises a plurality of payload signals modulating optical carriers of a certain wavelength and a non-payload signal modulating a specific optical carrier wavelength which is designated the optical supervisory channel (OSC) and denoted as "$\lambda 0$". For the purposes of this description, the payload-bearing wavelengths are denoted as "$\lambda 1$" through "$\lambda n$". In FIG. 1, a total of 6 wavelengths are identified for use with payload signals, although those familiar with this art will appreciate that the number of wavelengths available will depend upon the state of the technology and the number of wavelengths used will depend upon the physical topology and signal connectivity of the WDM network under consideration.

As will be discussed below, the non-payload data modulating the OSC in the WDM signal (the OSC message traffic) is generated by the CNM 123 and the various nodes 101–122 in the network 100 and used to perform operations, analysis and maintenance (OAM) functions. The OSC is described in Bell Core specification GR-1312-CORE, Generic Requirement of OFAs and Proprietary DWDM Systems-Dense Wavelength Division Multiplexed Systems, Sec. 3.6 "Optical Supervisory Channel."

Each payload signal within the WDM signal originates at an originating LTE 150–183, passes along the WDM network 100 and terminates at a terminating LTE. Each LTE 150–183 may serve as an originating LTE in respect of a first payload signal and as a terminating LTE in respect of a second payload signal, although for purposes of clarity of FIG. 1, each LTE is shown to serve a single purpose. Payload signals typically arrive at an originating LTE 150–183 and depart from a terminating LTE along a non-WDM optical network such as SONET or an electrical network.

For purposes of illustration, the payload signals which travel across the WDM network 100 are designated by upper-case letters in FIG. 1, shown on their originating and terminating LTEs 150–183, or on signal lines 192–194, 207–211 extending between pairs of nodes 103, 105, 113, 118.

Each payload signal is assigned a WDM compatible wavelength by the node 101–122 to which its originating LTE 150–183 is connected. For purposes of illustration, the assigned wavelength is assumed to be constant as the payload signal traverses segments 125–145 in the network and is denoted at the point where one of the signal lines 185–226 is connected to one of the nodes 101–122. It will be apparent to those skilled in this art, however, that the assigned wavelength may be changed by one of the nodes 101–122 from its upstream segment 125–145 to its downstream segment in order to conform to the requirements of the particular topology of the WDM network 100.

Figure 2A:
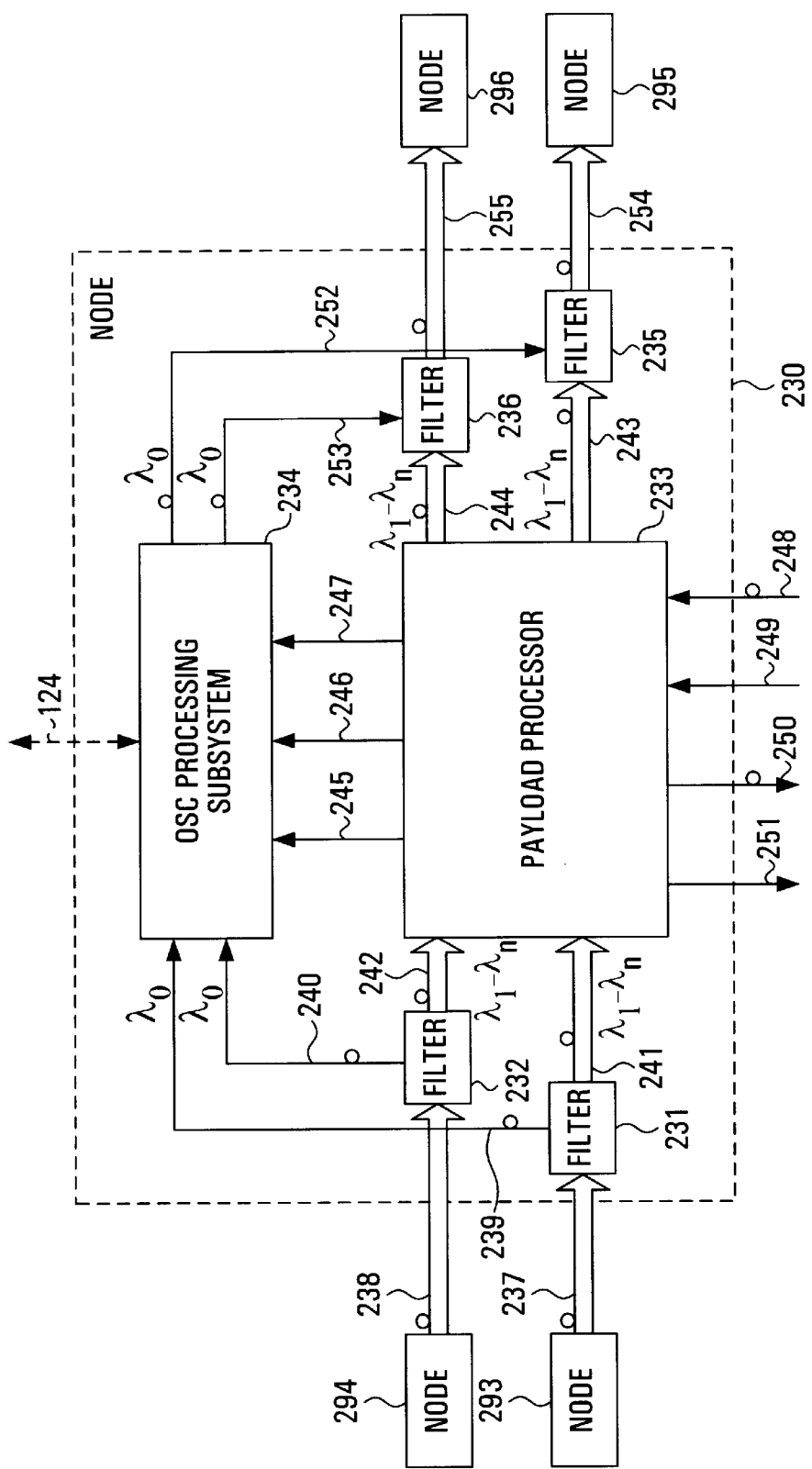
FIG. 2(a) is a block diagram of a typical node in a WDM network in accordance with a first embodiment of the present invention.

A block diagram of a typical node 230 is shown in FIG. 2(a). The node 230 comprises at least one upstream WDM filter 231, 232, a payload processor 233, an OSC processing subsystem 234 and at least one downstream WDM filter 235, 236. There is one upstream WDM filter 231, 232 for every upstream segment 237, 238 connected to the node 230, designated as upstream WDM signal segments. There is one downstream WDM filter 235, 236 for every downstream segment 254–255 connected to the node 230, designated as downstream WDM signal segments.

Each upstream WDM filter 231, 232 is connected to a downstream WDM filter (not shown) for an immediately upstream node 293, 294 by one of the upstream WDM signal segments 237, 238, to the OSC processing subsystem 234 by an upstream OSC optical fibre 239, 240 and to the payload processor 233 by an upstream payload WDM signal segment 241, 242.

The upstream WDM filter 231, 232 accepts as input a WDM signal from the upstream node 293, 294 along its upstream WDM signal segment 237, 238 and extracts the OSC modulated by the OSC message traffic as described below, which it transmits to the OSC processing subsystem 234 along its upstream OSC optical fibre 239, 240. The remainder of the WDM signal received by the upstream WDM filter 231, 232, comprising those WDM wavelengths modulated by payload data, still encoded in WDM format, are transmitted as an upstream payload WDM signal along its upstream payload WDM signal segment 241, 242 to the payload processor 233.

The payload processor 233 conventionally is connected to each upstream WDM filter 231, 232 by the corresponding upstream payload WDM signal segment 241, 242 and to each downstream WDM filter 235, 236 by a corresponding amplified payload WDM signal segment 243, 244. The payload processor 233 may also be connected to one or more of the LTEs 150–183 by an electrical cable 249, 251 or by an optical fibre 248, 250.

Figure 2B:
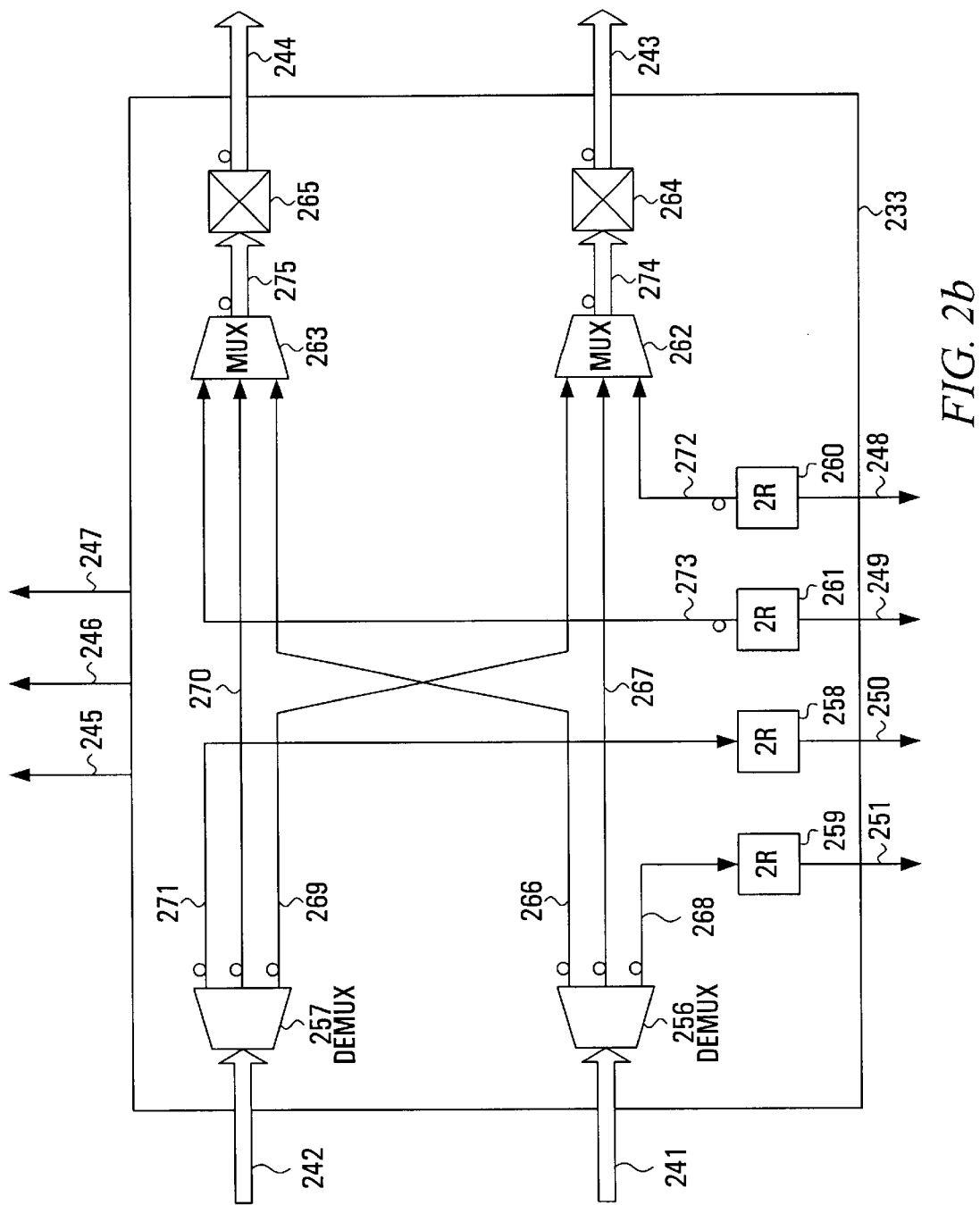
FIG. 2(b) is a block diagram of the payload processor shown in FIG. 2(a)

The payload processor 233 is shown in greater detail in the block diagram of FIG. 2(b) and may comprise zero or more of each of an optical demultiplexer 256, 257, a 2R (optical) off-ramp 258, a 2R (electrical) off-ramp 259, a 2R (optical) on-ramp 260, a 2R (electrical) on-ramp 261, an optical multiplexer 262, 263 and an optical amplifier 264, 265. It will be appreciated that the actual configuration of the payload processor 233 depends on the particular combination of functions to be performed by the node 230.

Each optical demultiplexer 256, 257 is connected to one of the upstream WDM filters 231, 232 by the corresponding upstream payload WDM signal segment 241, 242, to zero or more optical multiplexers 262, 263 by the corresponding forwarded WDM modulated signal segments 266, 267, 269, 270 and to each of zero or more 2R (optical) off-ramps 258 and/or 2R (electrical) off-ramps 259 by a removed WDM modulated signal segment 268, 271. There will be one forwarded WDM modulated signal segment 266, 267, 269, 270 or removed WDM modulated signal segment 268, 271 emanating from an optical demultiplexer 256, 257 for each WDM carrier wavelength present in the corresponding upstream payload WDM signal arriving at the optical demultiplexer along the corresponding upstream payload WDM signal segment 241, 242.

The optical demultiplexer 256, 257 separates the WDM carrier wavelengths present in the corresponding upstream payload WDM signal arriving along the upstream payload WDM signal segment 241, 242 and transmits each WDM carrier wavelength either along one of the forwarded WDM modulated signal segments 266, 267, 269, 270 to an optical multiplexer 262, 263 or along one of the removed WDM modulated signal segments 268, 271 to one of the 2R (optical) off-ramps 258 or 2R (electrical) off-ramps 259 as the case may be.

Each 2R (optical) off-ramp 258 is connected to one of the optical demultiplexers 257 by the corresponding removed WDM modulated signal segment 271 and to one of the LTEs 150–183 by the corresponding signal line 250 which is an optical fibre. The 2R (optical) off–ramp 258 repeats and reshapes the WDM carrier wavelength modulated by payload data arriving along the removed WDM modulated signal segment 271, effectively extracting the payload data by demodulation and remodulating the payload data about a non-WDM optical carrier wavelength for transmission to the corresponding LTE 150–183 along the signal line 250 extending between them. This processing is required because the LTE 150–183 is not equipped to handle WDM carrier wavelengths.

Each 2R (electrical) off-ramp 259 is connected to one of the optical demultiplexers 256 by the corresponding removed WDM modulated signal segment 268 and to one of the LTEs 150–183 by a signal line 251 which is an electrical cable. The 2R (electrical) off-ramp 259 repeats and reshapes the WDM carrier wavelength modulated by payload data arriving along the removed. WDM modulated signal segment 268, effectively extracting the payload data by demodulation and remodulating the payload data about an electrical carrier frequency for transmission to the LTE 150–183. This processing is required because the LTE 150–183 is not equipped to handle WDM carrier wavelengths. The 2R (electrical) off-ramp 259 may comprise a 2R (optical) off-ramp 258 whose output is connected to the input of a photo-diode decoder.

Each 2R (optical) on-ramp 260 is connected to one of the optical multiplexers 262 by an added WDM modulated signal segment 272 and to one of the LTEs 150–183 by the corresponding signal line 248 which is an optical fibre. The 2R (optical) on-ramp 260 repeats and reshapes the non-WDM optical carrier wavelength modulated by payload data arriving along the signal line 248 from the LTE 150–183, effectively extracting the payload data by demodulation and remodulating the payload data about a WDM carrier wavelength for transmission to the optical multiplexer 262 along the added WDM modulated signal segment 272. This processing is required because the LTE 150–183 does not use WDM carrier wavelengths.

Each 2R (electrical) on-ramp 261 is connected to one of the optical multiplexers 263 by an added WDM modulated signal segment 273 and to one of the LTEs 150–183 by the corresponding signal line 249 which is an electrical cable. The 2R (electrical) on-ramp 259 repeats and reshapes the electrical carrier signal modulated by payload data arriving along the signal line 249 from the LTE 150–183, effectively extracting the payload data by demodulation and remodulating the payload data about a WDM carrier wavelength for transmission to the optical multiplexer 263 along the added WDM modulated signal segment 273. This processing is required because the LTE 150–183 does not use WDM carrier wavelengths. The 2R (electrical) on-ramp 261 may comprise a 2R (optical) on-ramp 260 whose input is connected to the output of a photo-diode encoder.

Each optical multiplexer 262, 263 is connected to one of the optical amplifiers 264, 265 by a corresponding generated payload WDM signal segment 274, 275, to zero or more optical demultiplexers 256, 257 by the corresponding forwarded WDM modulated signal segments 266, 267, 269, 270 and to each of zero or more 2R (optical) on-ramps 260 and/or 2R (electrical) on-ramps 261 by the corresponding added WDM modulated signal segments 272, 273. There will be one forwarded WDM modulated signal segment 266, 267, 269, 270 or added WDM modulated signal segment 272, 273 entering an optical multiplexer 262, 263 for each WDM carrier wavelength present in the corresponding generated payload WDM signal leaving the optical multiplexer 262, 263 along the corresponding generated payload WDM signal segment 274, 275. There is no requirement that forwarded WDM modulated signal segments 266, 267 or 269, 270 that are demultiplexed by the same optical demultiplexer 256 be remultiplexed together in the same optical multiplexer 262, 263.

The optical multiplexer 262, 263 combines the WDM carrier wavelengths modulated by payload data present in the forwarded WDM modulated signal segments 266, 267, 269, 270 emanating from one of the optical multiplexers 256, 257 and the added WDM modulated signal segments 272, 273 emanating from one of the 2R (optical) on-ramps 260 or 2R (electrical) on-ramps 261, as the case may be, into a generated payload WDM signal which it transmits to its corresponding optical amplifier 264, 265 along the generated payload WDM signal segment 274, 275 extending between them.

Each optical amplifier 264, 265 is connected to one of the optical multiplexers 262, 263 by the corresponding generated payload WDM signal segment 274, 275 and to one of the downstream WDM filters 235, 236 by the corresponding amplified payload WDM signal segment 243, 244. The optical amplifier 264, 265 linearly amplifies the generated payload WDM signal arriving along its corresponding generated payload WDM signal segment 274, 275 for transmission as an amplified payload WDM signal to the corresponding downstream WDM filter 235, 236 along the amplified payload WDM signal segment 243, 244 extending between them.

The OSC processing subsystem 234 conventionally is connected to each upstream WDM filter 231, 232 by the corresponding upstream OSC optical fibres 239, 240 and to each downstream WDM filter 235, 236 by corresponding downstream OSC optical fibres 252, 253. Where the node 230 is connected to the CNM 123 (not shown) by a communication link 124, the OSC processing subsystem 234 is connected by the communication link 124 (shown as a dotted line) to the CNM.

Figure 2C:
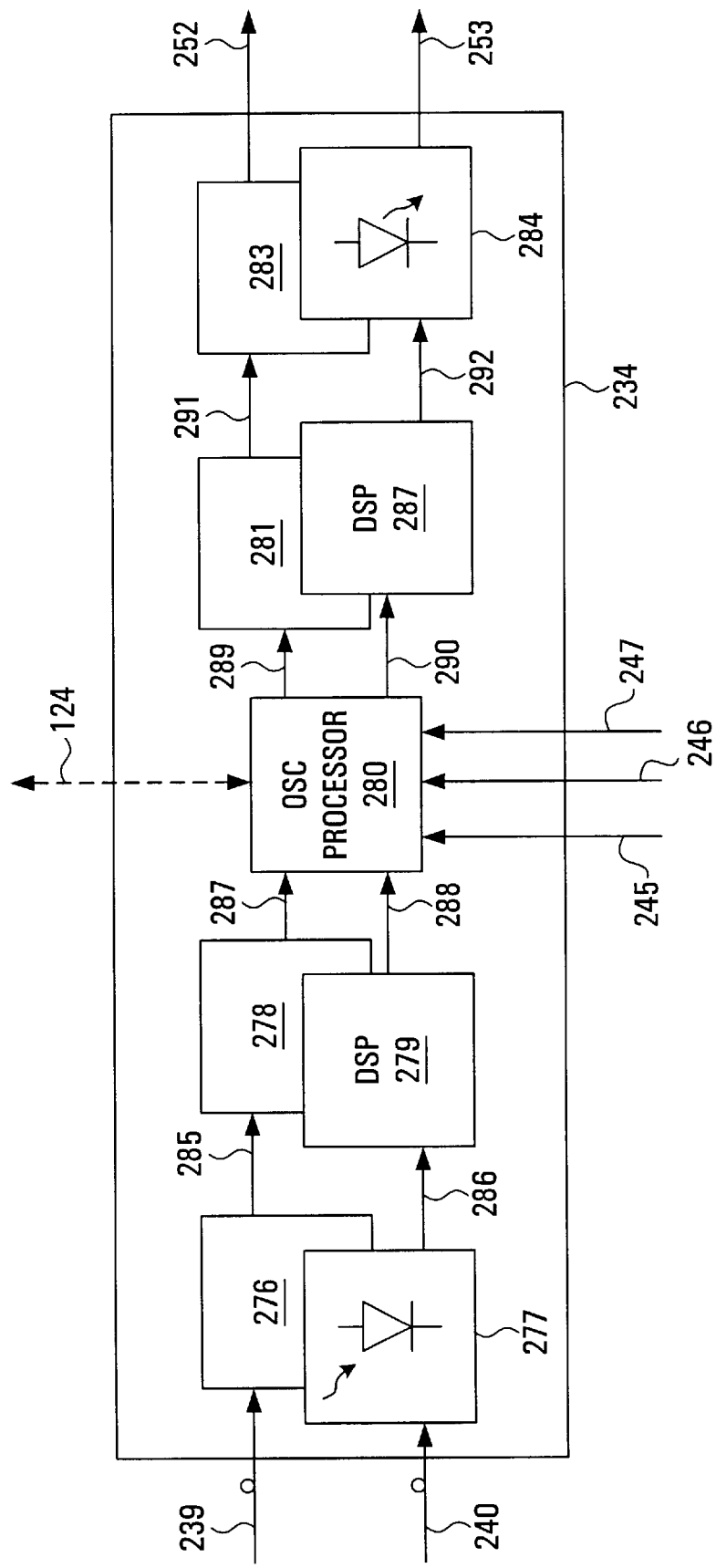
FIG. 2(c) is a block diagram of the optical service channel (OSC) processing subsystem shown in FIG. 2(a)
Figure 3A:
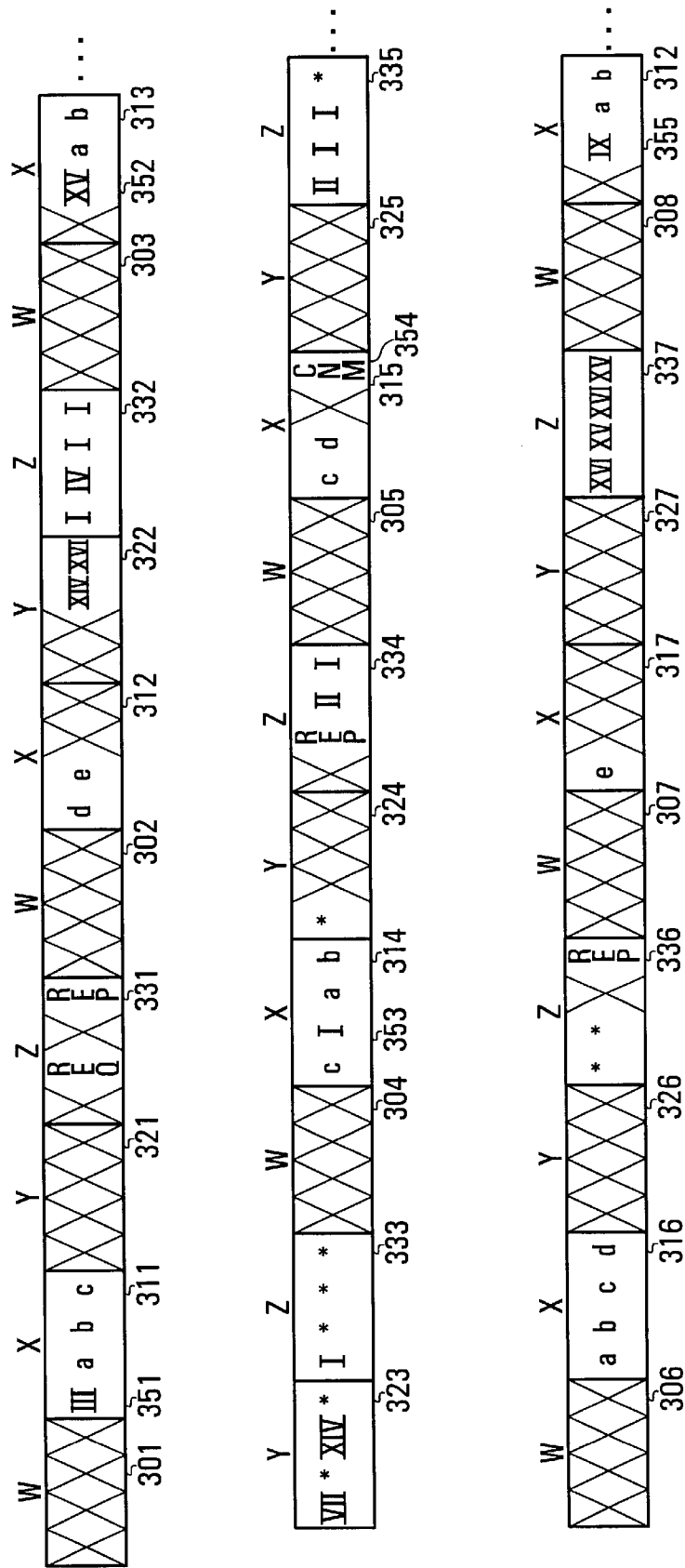
FIG. 3(a) is a diagrammatic representation of TDM)M channel W of OSC message traffic.
Figure 3B:
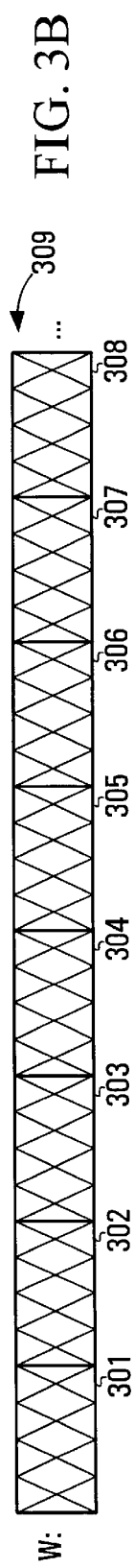
FIG. 3(b) is a diagrammatic representation of TDM channel X of OSC message traffic.
Figure 3C:
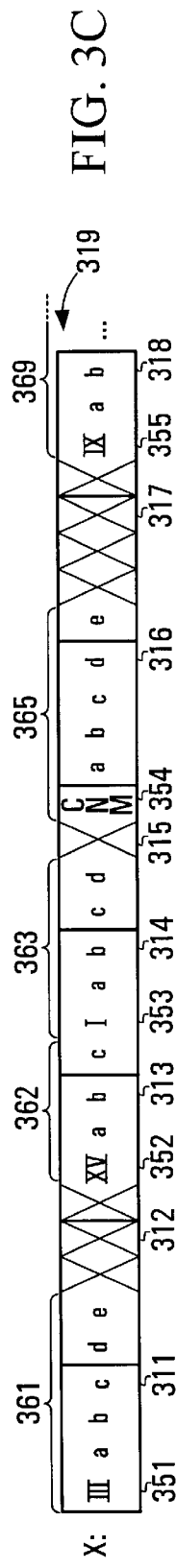
FIG. 3(c) is a diagrammatic representation of TDM channel Y of OSC message traffic, which contains the node-to-node message in accordance with an embodiment of the present invention.
Figure 3D:
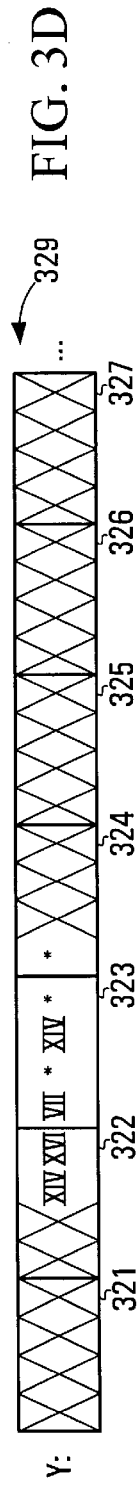
FIG. 3(d) is a diagrammatic representation of TDM channel Z of OSC message traffic, which contains the node connectivity request and report messages in accordance with an embodiment of the present invention.
Figure 3E:
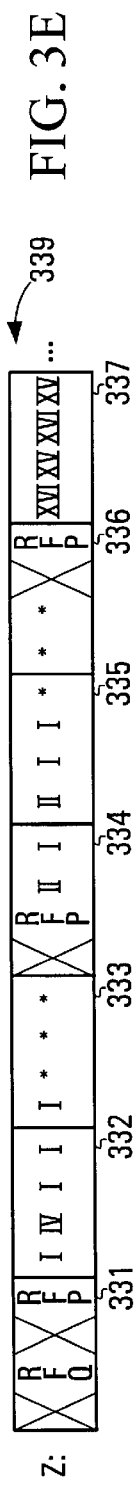
FIG. 3(e) is a diagrammatic representation of TDM channel 7 of the OSC message traffic shown in FIG. 3(a).

The OSC processing subsystem 234 is shown in greater detail in FIG. 2(c). It processes the OSC modulated by OSC message traffic 300 and comprises at least one OSC photo-diode decoder 276, 277, at least one upstream digital signal processor 278, 279, an OSC processor 280, at least one downstream digital signal processor 281, 282 and at least one OSC laser encoder 283, 284. There is one OSC photo-diode decoder 276, 277 and one upstream digital signal processor 278, 279 for each upstream OSC optical fibre 239, 240. There is one downstream digital signal processor 281, 282 and one OSC laser encoder 283, 284 for each downstream OSC optical fibre 252, 253.

Each OSC photo-diode decoder 276, 277 is connected to one of the upstream WDM filters 231, 232 by the corresponding upstream OSC optical fibre 239, 240 and to one of the upstream digital signal processors 278, 279 by a corresponding upstream electrical cable 285, 286. The OSC photo-diode decoder 276, 277 demodulates the OSC wavelength modulated by the OSC message traffic 300 which arrives along the upstream OSC optical fibre 239, 240 to convert the optical signal to analog electrical form which it transmits as a corresponding upstream OSC electrical signal along the upstream electrical cable 286, 287.

Each upstream digital signal processor 278, 279 is connected to one of the OSC photo-diode decoders 276, 277 by the corresponding upstream electrical cable 286, 287 and to the OSC processor 280 by a corresponding upstream digital data cable 287, 288. The upstream digital signal processor 278, 279 converts the OSC message traffic 300 contained in the upstream OSC electrical signal which arrives along the upstream electrical cable 286, 287 into digital form which it transmits as a corresponding upstream OSC data stream along the upstream digital data cable 287, 288.

The OSC processor 280 conventionally is connected to each upstream digital signal processor 278, 279 by the corresponding upstream digital data cable 287, 288 and to each downstream digital signal processor 281, 282 by a corresponding downstream digital data cable 289, 290. One of the nodes 101 is connected to the CNM 123. The OSC processor 280 for that node 101 is connected by the communication link 124 (shown as a dotted line) to the CNM 123.

As described below, the OSC processor 280 processes the upstream OSC digital data streams which arrive along each of the upstream digital data cables 287, 288. If the node 230 is connected to the CNM 123, the OSC processor 280 also processes any messages which arrive from the CNM 123 along the communication link 124.

The results of the processing performed by the OSC processor 280 are transmitted in digital form as downstream OSC data streams along each of the downstream digital data cables 289, 290 to the corresponding downstream digital signal processors 281, 282. If the node 230 is connected to the CNM 123, the OSC processor 280 may also transmit messages to the CNM 123 along the communication link 124.

Each downstream digital signal processor 281, 282 is connected to the OSC processor 280 by the corresponding downstream digital data cable 289, 290 and to one of the OSC laser encoders 283, 284 by a corresponding downstream electrical cable 291, 292. The downstream digital signal processor 281, 282 converts the digital OSC message traffic 300 contained in the downstream OSC data stream which arrives along the downstream digital data cable 289, 290 into analog form which it transmits as a corresponding downstream OSC electrical signal along the downstream electrical cable 291, 292.

Each OSC laser encoder 283, 284 is connected to one of the downstream digital signal processors 281, 282 by the corresponding downstream electrical cable 291, 292 and to one of the downstream WDM filters 235, 236 by the corresponding downstream OSC optical fibre 252, 253. The OSC laser encoder 283, 284 modulates the OSC wavelength with the downstream OSC electrical signal which arrives along the downstream electrical cable 291, 292 and transmits the OSC modulated by OSC message traffic 300 along the downstream OSC optical fibre 252, 253 to the corresponding downstream WDM filter 235, 236

Each downstream WDM filter 235, 236 is connected to an upstream WDM filter (not shown) for an immediately downstream node 295, 296 by one of the downstream WDM signal segments 254, 255, to the OSC processing subsystem 234 by corresponding downstream OSC optical fibres 252, 253 and to the payload processor 233 by corresponding amplified payload WDM signal segments 243, 244. The downstream WDM filter 235, 236 combines the OSC modulated by OSC traffic 300 arriving along the corresponding downstream OSC optical fibre from the OSC processing subsystem 234 with the amplified payload WDM signal arriving along the corresponding amplified payload WDM signal segment 243, 244 and transmits the resulting downstream WDM signal along the corresponding downstream WDM signal segment 254, 255 to the downstream node 295, 296.

Typically, the OSC message traffic is time division multiplexed into channels, with only a few channels actually in use. The OSC message traffic 300 which modulates the OSC is shown in exemplary form in FIG. 3. FIGS. 3(a) through (d) respectively show the OSC message traffic grouped according to each of four TDM channels 309, 319, 329, 339 which are interlaced to form a single OSC message in TDM form. For example, the OSC message traffic cells 311–318 which conventionally pass between the CNM 123 and individual nodes 101–122 may be assigned to TDM channel X 319, with channels W 309, Y 329 and Z 330 reserved for other kinds of OSC message traffic.

Conventionally, OSC message traffic 300 is limited to messages from the CNM 123 sent to one of the nodes 101–122 in the network 100, or messages sent from one of the nodes 101–122 to the CNM 123.

OSC message traffic 300 exchanged between the CNM 123 and one of the nodes 101–122 in the network 100 comprises OSC messages 361–365. Each message bears an address corresponding to the intended recipient of the message, whether the CNM 123 or a node 101–122, and data.

The CNM 123 transmits OSC messages 361–364 which it intends to send along the network 100 in the form of an outgoing CNM digital data stream along the communications link 124. The outgoing CNM digital data stream is similar to the upstream OSC data streams transmitted by the upstream digital signal processors 278, 279 to the OSC processor 280 along the upstream digital data cables 287, 288.

OSC messages 361–364 sent by the CNM 123 to a node 101–122 may request the node to perform such tasks as changing the severity of an alarm, altering the connection map for the node or provisioning or deprovisioning a network component, that is, to activate or deactivate the component.

The processing performed by the OSC processor 280 of a node 230 on conventional OSC message traffic 300 consists entirely of identifying the embedded OSC message(s) 361–364, determining whether the address of any identified message corresponds to that of the node, removing any messages whose address corresponds to that of the node, acting on these messages and conveying the balance of the OSC message traffic downstream. The messages are handled through public protocols already known in this art, for example, TCP/IP over PPP, although other protocols will be apparent to those skilled in this art.

Accordingly, OSC message traffic 300 circulates along the network 100 from node 101–122 to node until the intended recipient is reached, whereupon the message 361–364 is removed from the OSC message traffic by the node. The various public protocols known in this art can handle multiple path, with provision for time-outs in the protocol stack to handle large fast bit rates where bandwidth is typically on the order of several megabits per second.

Each node 101–122 may, as the need arises, determine that an OSC message 365 should be sent to the CNM 123. If so, it constructs the OSC message 365, which may report an alarm condition detected by the node 101–122, provide an acknowledgment to a request from the CNM 123 or report a spontaneous provisioning or deprovisioning action. The OSC processor 280 addresses the OSC message 365 to the CNM 123, and inserts it into its downstream digital data streams along the downstream digital data cables 289, 290, for eventual transmission to the immediately downstream node 295, 296, to be processed as described above. The various pubic protocols known in this art have built-in routing discovery to automatically determine the message path.

Where the OSC processor 280 corresponds to a node 101 which is connected to the CNM 123, it processes messages 365 whose address 354 corresponds to that of the CNM 123 in the same way as it processes messages whose address corresponds to that of the current node 230 with the exception that rather than acting on such messages, the OSC processor 280 forwards them to the CNM 123 in the form of an incoming CNM digital data stream along the communications link 124. The incoming CNM digital data stream is similar to the downstream OSC data streams transmitted by the OSC processor 280 to the downstream digital signal processors 281, 282 along the downstream digital data cables 289, 290.

In order to guarantee that OSC message traffic reaches its destination, the components of the nodes 230 which process OSC message traffic 300 are typically shared by the complementary networks in both directions. Thus, even where the network configuration is linear, as seen in the portion of the network 100 comprising nodes XV–XXII 115–122, OSC messages from the CNM 123 can be delivered to node XV 115 and OSC messages from node XXII 122 can be delivered to node I 101 for transmission along the link 124 to the CNM 123 by using the OSC in the complementary network (not shown).

Until now, everything described is entirely conventional. While there is some minimal tracking of the topology of the WDM network 100 by the CNM 123 through the exchange of provisioning messages, this tracking is insufficient to determine the actual topology of the network 100, that is, the manner in which nodes 101–122 and segments 125–145 are interconnected. Moreover, this tracking does nothing to assist in understanding the signal connectivity where signals originate, terminate and travel along the network, and along which wavelengths.

The present invention provides a mechanism whereby the CNM 123 is provided with an up-to-date map of the topology of the network 100, as well as a map of the paths taken by each signal along the network, by introducing new messages for transmission along the OSC. The new messages identify the expected bundle of signals contained in a fibre segment 125–175. In the present invention, the additional functions of which the CNM 123 is responsible for in this embodiment; are accomplished by a mapping processor (not shown) which may be a hardware circuit, a software process operating within the CNM 123 or a combination thereof. Those familiar with this art will appreciate that the mapping processor function may optionally incorporate hardware and/or software elements outside the CNM 123.

In accordance with an embodiment of the present invention, connections are added between the payload processor 233 and the OSC processor 280 within the OSC processing subsystem 234 of each node 230, comprising an added wavelengths signal line 245, a removed wavelengths signal line 246 and a forwarded wavelengths signal line 247. The payload processor 233, by its very nature, knows the internal processing which it performs on the incoming wavelengths and is able to generate the appropriate signals along these signal lines 245–247. The signals themselves may be passed by one or more mechanisms known in this art, including but not limited to memory mapping, interprocessor messaging and TDM proprietary messaging.

Also in accordance with an embodiment of the present invention, the OSC message traffic 300 is altered in that two of the conventionally unused OSC TDM channels are reserved for use in the present invention. These are designated for exemplary purposes only as TDM channels Y 329 and Z 339.

The first TDM channel Y 329 is reserved for a single message type 400 which is sent from one node 230 to the immediately downstream node 295, 296, the format of which is shown in exemplary fashion in FIG. 4. This node-to-node message 400, which in effect acts like a token being passed along the network 100, defines the state of the WDM signal leaving the node 230 which is generating the message (the reporting element) along one of its downstream WDM signal segments 254, 255. It will be apparent to those skilled in this art that if faster updating is required, a plurality of node-to-node messages 400 could be circulated.

The node-to-node message 400 comprises a number of fields 401–407, each of which potentially contain the identity of one of the nodes 101–122 in the WDM network 100. The first field 401 contains the identity of the reporting element. The remaining fields 402–407 contain the identity of the node 101–122 which is the source of the payload signal which modulates each potential wavelength along the downstream WDM signal segment 254, 255 to which the node-to-node message applies. It is assumed, for illustrative purposes that there are only 6 possible wavelengths in the WDM signal. Thus there are 6 such payload source fields. The source of a payload signal is the identity of the node 101–122 which added the particular payload.

Node-to-node messages 400 may be sent across message loops as the routing layer of the public protocol chosen (for example TCP/IP over PPP) can differentiate and properly process this situation.

Table 1 below sets the values of each field 401–407 in the node-to-node message 400 that would be reported by each node 101–122 shown in FIG. 1. A "★" indicates that the particular wavelength is unused in the WDM signal in the downstream segment so that the message field has been blanked out for purposes of clarity only. It is likely that the message fluid contains a random, initialized or an outdated value.

TABLE 1

| Rep. Node | λ1 | λ2 | λ3 | λ4 | λ5 | λ6 |
|---|---|---|---|---|---|---|
| I | I | I | I | * | * | * |
| II | II | I | I | * | * | * |
| III | II | VII | * | * | * | * |
| IV | II | IV | * | * | * | * |
| V | XVI | I | I | XIV | * | * |
| VI | VI | I | I | XIV | * | * |
| VII | VI | VII | I | XIV | * | * |
| VIII | VI | VII | I | XIV | * | * |
| IX | IX | VII | I | XIV | * | * |
| X | IX | VII | X | XIV | * | * |

TABLE 1-continued

| Rep. Node | λ1   | λ2  | λ3 | λ4   | λ5  | λ6  |
|-----------|------|-----|----|------|-----|-----|
| XI        | XI   | VII | X  | XIV  | *   | *   |
| XII       | XI   | VII | X  | XIV  | *   | *   |
| XIII      | XVI  | VII | XV | *    | *   | *   |
| XIV       | XVI  | VII | *  | XIV  | *   | *   |
| XV        | *    | XV  | XV | *    | *   | *   |
| XVI       | XVI  | XV  | XV | *    | XVI | XVI |
| XVII      | XVI  | XV  | XV | *    | XVI | XVI |
| XVIII     | XI   | XV  | X  | XIV  | XVI | XVI |
| XIX       | XIX  | XV  | X  | XIV  | XVI | XVI |
| XX        | XIX  | XV  | *  | XIV  | *   | XVI |
| XXI       | *    | XV  | *  | XIV  | *   | *   |
| XXII      | *    | *   | *  | *    | *   | *   |

The configuration of the downstream payload WDM signal which is transmitted by a node 230 along one of its downstream WDM signal segments 254, 255 is the same as the configuration of the corresponding amplified payload WDM signal transmitted by the payload processor 233 along the corresponding amplified payload WDM signal segment 243, 244 and may be obtained from the configuration of the upstream payload WDM signal which it receives along its upstream payload WDM signal segment 241, 242, together with knowledge of how those payload signals are rerouted between the stages of demultiplexing and multiplexing, of those payload signals which the node itself adds to the amplified payload WDM signals 243, 244 and of those payload signals which the node itself removes from the upstream payload WDM signals arriving along the upstream payload WDM signal segments 241, 242.

The node 230 obtains knowledge of the configuration of its upstream payload WDM signals sent along its upstream payload WDM signal segments 241, 242 from the upstream node 293, 294-to-node messages 400 which it receives along the OSC along upstream segments in accordance with the present invention.

Each upstream node-to-node message 400 is received by the node 230 along its corresponding upstream WDM signal segment 237, 238, processed by the corresponding upstream WDM filter 231, 232, the corresponding OSC photo-diode decoder 276, 277 and the corresponding upstream digital signal processor 278, 279. The OSC processor 280 receives the upstream OSC data stream containing the OSC message traffic 300 in digital form which arrives along the corresponding upstream digital data cable 287, 288, separates it into its component TDM channels (in our example, W 309, X 319, Y 329 and Z 339) and extracts the upstream node-to-node message 400 from the appropriate channel 329.

Initially, the source information for all payload signals is unknown as the only direct knowledge of source information must originate with the node which added the particular payload signal which modulates the wavelength under consideration. Gradually, as node-to-node messages 400 circulate between nodes 101–122, this information becomes known.

The remainder of the knowledge required by the node 230 to determine the configuration of the amplified payload WDM signal for each one of the amplified payload WDM signal segments 243, 244 is obtained by the OSC processor 280 in accordance with the present invention from the payload processor 233 along the added wavelengths signal line 245, the removed wavelengths signal line 246 and the forwarded wavelengths signal line 247.

The added wavelengths signal line 245 identifies which payload signals have been added by the payload processor 233 to one of the amplified payload WDM signals along one of the amplified payload WDM signal segments 243, 244, to which amplified payload WDM signal segments 243, 244 the payload signals have been added, and to which WDM carrier wavelengths the payload signals have been assigned.

The identification is made in a manner known in the art and consistent with the signalling mechanism chosen to convey information from the payload processor 233 to the OSC processor 280 along signal lines 245–247.

The removed wavelengths signal line 246 identifies which payload signals have been removed by the payload processor 233 from one of the upstream payload WDM signals along one of the upstream WDM signal segments 241, 242, from which upstream payload WDM signal segment 241, 242 the payload signals have been removed, and which WDM carrier wavelengths the payload signals had modulated.

The forwarded wavelengths signal line 247 identifies which payload signals were forwarded from one of the upstream payload WDM signals along one of the upstream payload WDM signal segments 241, 242 to one of the amplified payload WDM signals along one of the amplified payload WDM signal segments 243, 244, from which upstream payload WDM signal segment 241, 242 the payload signals entered the payload processor 233 and along which amplified payload WDM signal segment 243, 244 the payload signals left the payload processor 233, and which WDM carrier wavelengths the payload signals modulated upon arrival at and departure from the payload processor 233.

The information on those payload signals which the node 230 itself adds into the amplified payload WDM signals along the amplified payload WDM signal segments 243, 244 or removes from the upstream payload WDM signals along the upstream payload WDM signal segments 241, 242 and the information on how payload signals are rerouted between demultiplexing and remultiplexing is known because this processing is performed by the payload processor 233 for the node itself and communicated to the OSC processor 280 for the node by the payload processor along the added wavelengths signal line 245, the removed wavelengths signal line 246 and the forwarded wavelengths signal line 247 respectively.

Figure 5A:
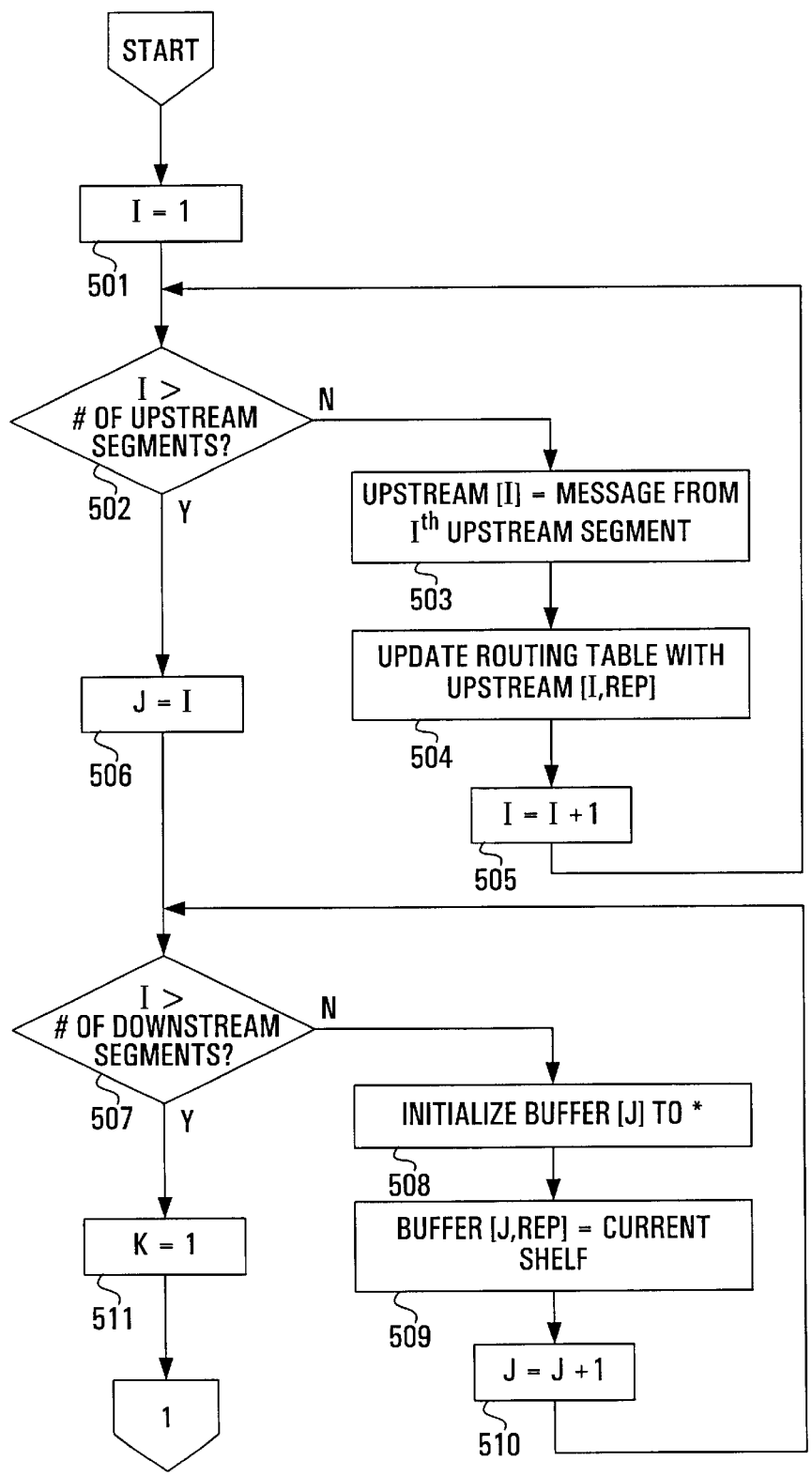
FIGS. 5(a)–(c) are flow charts of the logical steps taken by an OSC processor in a node to process the received upstream node-to-node messages and to generate the required downstream node-to-node messages for transmission along the downstream segment in accordance with an embodiment of the present invention
Figure 5B:
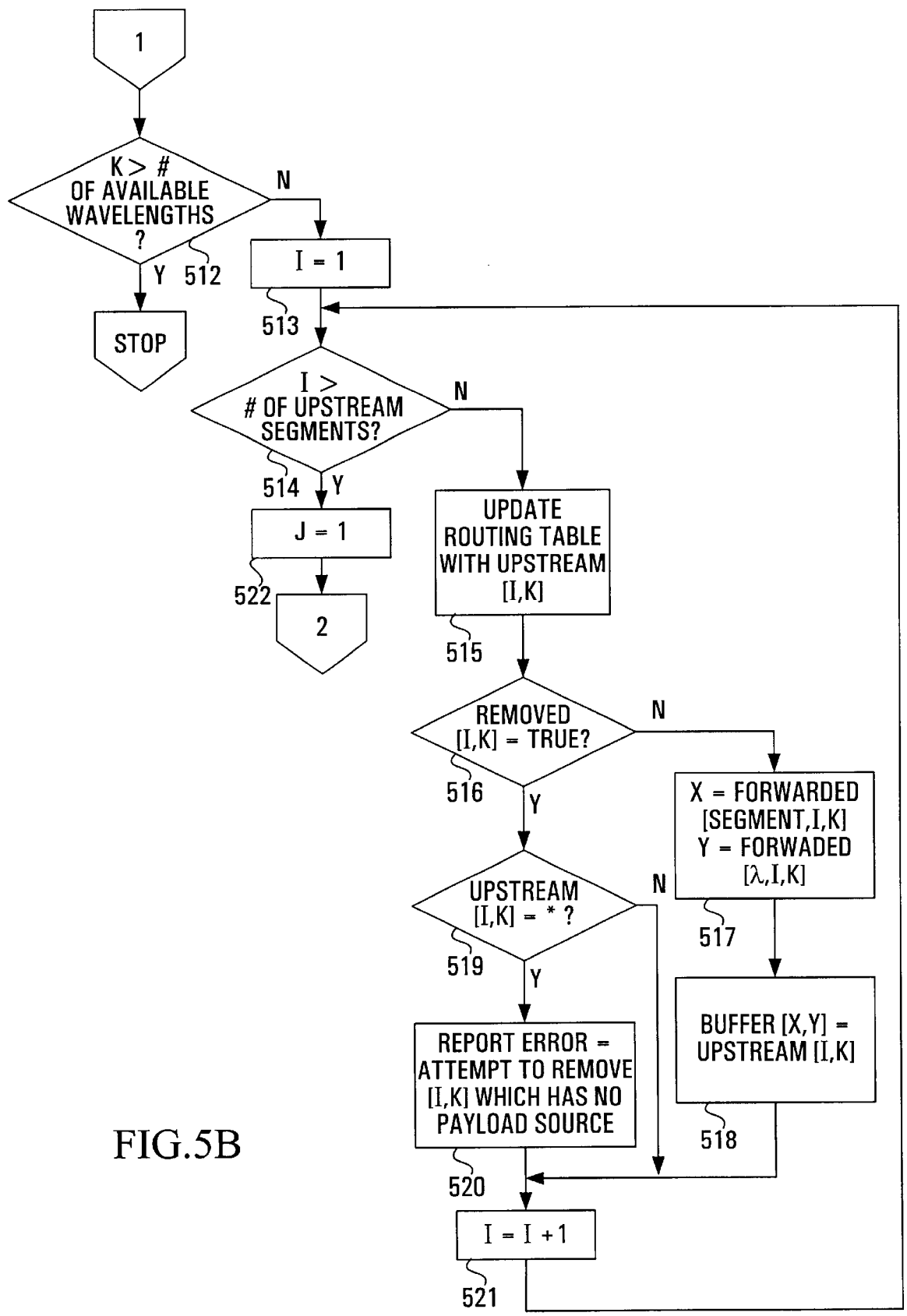
Figure 5C:
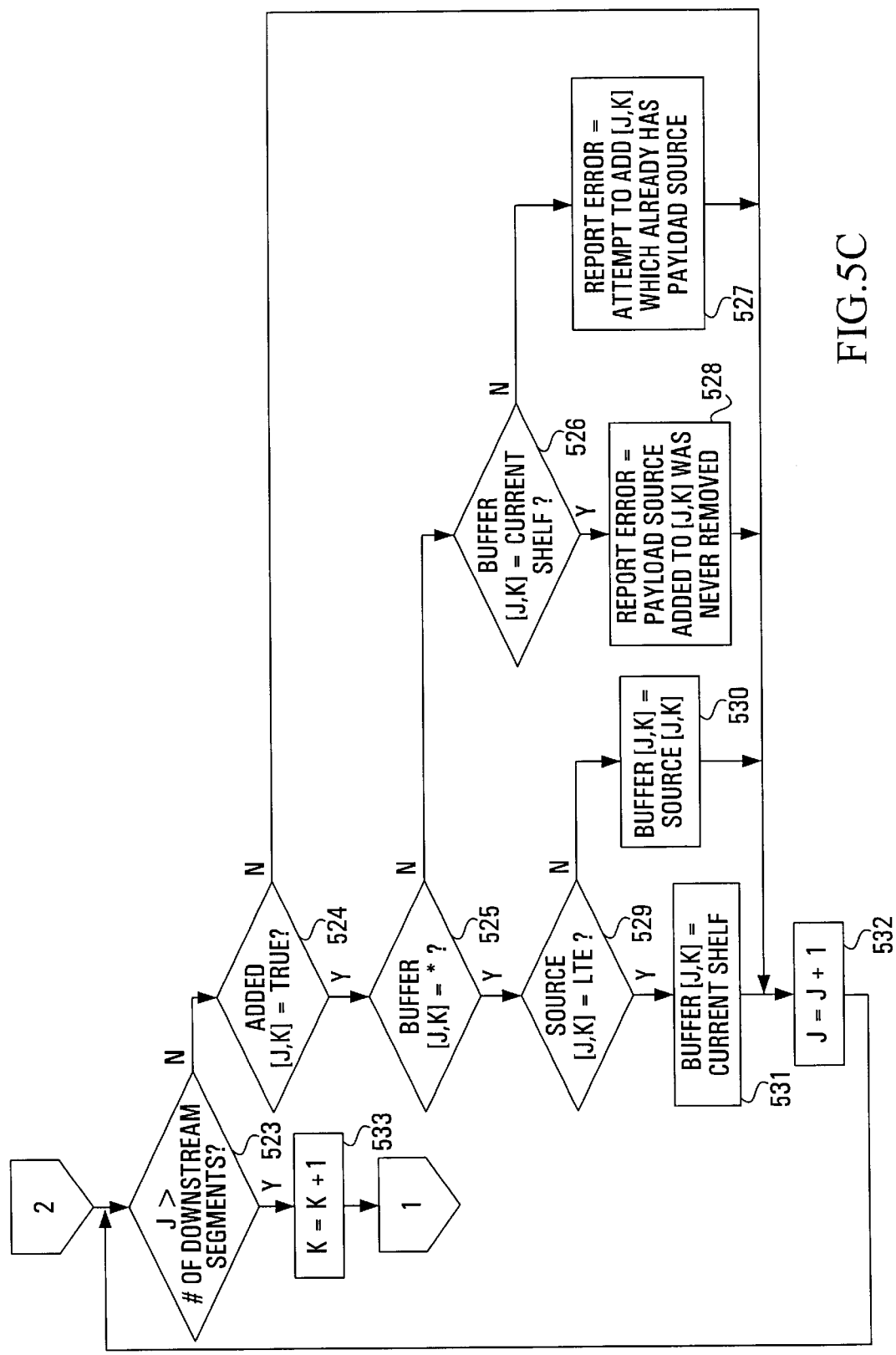

FIG. 5 sets out in flow chart form the logical steps taken by the OSC processor 280 in the preferred embodiment in processing the upstream node-to-node message 400 and generating the outgoing downstream node-to-node message 400. It will be recognized that the steps and their particular order are illustrative only and there may exist other algorithms for achieving the same objective.

The OSC processor 280 is continuously triggered to generate a set of downstream node-to-node messages 400 to fill the time slot assigned to the message. As the message data continues to circulate and the configuration of the network 100 becomes better known, the data in the node-to-node message 400 will change to reflect this increased knowledge. The outgoing node-to-node message 400 will be computed using the latest incoming node-to-node message, which is processed in an asynchronous fashion.

Upon the occurrence of each trigger, the OSC processor 280 performs some initialization steps. First, the OSC processor 280 copies each of the most recent upstream node-to-node messages 400 into appropriate buffer space 503, designated as Upstream[x,z] in FIG. 5, where x is an index representing the number of upstream segments and z is an index which takes on the values "Rep. node" and 1 through n, the number of active wavelengths in the network 100.

Second, the OSC processor 280 updates the node's 230 internal routing table using the "Rep. node" field of each upstream node-to-node message 504, which identifies a node whose downstream messages may be received by the current node and correspondingly, identifies a node which would receive a message transmitted by the current node along the complementary network (not shown). These first two initialization steps make use of an iteration variable I which takes on values from 1 to the number of upstream segments entering the node 501, 502, 505, which is known by each payload processor 233.

Third, the OSC processor 280 initializes buffers which will hold each of the downstream node-to-node messages 400 to be generated 508, designated as Buffer[y, z] in FIG. 5, where y is an index representing the number of downstream segments and z is an index which takes on the values "Rep. node" and 1 through n, the number of active wavelengths in the network 100.

Fourth, the OSC processor 280 copies the current node's identification into the "Rep. node" field of each of the downstream node-to-node message buffer 509. These last two initialization steps make use of an iteration variable J which takes on values from 1 to the number of downstream segments leading from the node 506, 507, 510.

Having completed these initialization steps, the OSC processor 280 then calculates the values to be inserted into the wavelength fields of each of the downstream node-to-node message buffers. In the preferred embodiment, this calculation is performed on a wavelength by wavelength basis, making use of an iteration variable K which takes on values from 1 to n 511, 512, 533.

For each value of K, the OSC processor 280 performs the following steps, on a segment by segment basis, making use of iteration variable I which takes on values from 1 to the number of upstream segments 513, 514, 521:

(a) it updates the node's internal routing table using the Kth wavelength field of the Ith upstream node-to-node message 515, which identifies a node whose downstream messages may be received by the current node and correspondingly, identifies a node which would receive a message transmitted by the current node along the complementary network;

(b) it reviews the data it receives from the payload processor 233 along the removed wavelengths signal line 246 to determine if the payload signal modulating the Kth wavelength received along the Ith upstream segment was removed by the payload processor 516;

(c) if not, it reviews the data it receives from the payload processor 233 along the forwarded wavelengths signal line 247 to determine the downstream segment X and the wavelength Y to which the payload signal modulating the Kth wavelength received along the Ith upstream segment was rerouted by the payload processor 517 and copies the node identifier from the Kth location in the Ith upstream node-to-node message into the Yth location in the Xth downstream node-to-node message buffer 518; and (d) if so, it determines whether the node identifier from the Kth location in the Ith upstream node-to-node message was unused 519 and if so, reports an error message because there has been an attempt to remove a payload signal from an unmodulated wavelength 520. In the preferred embodiment, the error condition is reported as a conventional alarm raised by the current node 230 and directed to the CNM 123 along TDM channel X 319 in conventional fashion.

For each value of K, the OSC processor 280 then performs the following steps, on a segment by segment basis, making use of iteration variable J which takes on values from 1 to the number of downstream segments 522, 523, 532:

(a) it reviews the data it receives from the payload processor 233 along the added wavelengths signal line 245 to determine if the payload signal modulating Kth wavelength transmitted along the Jth downstream segment was removed by the payload processor 524;

(b) if so, it determines whether the Kth location in the Jth downstream node-to-node message buffer remains initialized 525. Because the Kth wavelength in the Jth downstream segment is being modulated by a new signal, this location should be unused. If not, it reports one of two error conditions depending on whether the node identifier in this location is the current node identifier 526;

(c) If the node identifier in this location is not the current node identifier, the error reported is that there has been an attempt to add a payload signal to an already modulated wavelength 527. In the preferred embodiment, the error condition is reported as a conventional alarm raised by the current node 230 and directed to the CNM 123 along TDM channel X 319 in conventional fashion;

(d) If the node identifier in this location is the current node identifier, the error reported is that the payload signal previously added by the node 230 was never removed by another node along the network 528. In the preferred embodiment, the error condition is reported as a conventional alarm raised by the current node 230 and directed to the CNM 123 along TDM channel X 319 in conventional fashion;

(e) If the location is unused, it determines whether the original source of the added payload signal is an LTE 150–183 connected to the current node 230 or another network loop (as is shown in FIG. 1 at nodes 103, 105, 113, 118) 529;

(f) If the original source is an LTE 150–183, it inserts the identity of the current node 230 into the Kth location of the Jth downstream node-to-node message buffer 531; and (g) If the original source is another network loop, it copies the node identifier provided by the network loop into the Kth location of the Jth downstream node-to-node message buffer 530.

Having generated all of the downstream node-to-node messages as described above, the OSC processor 280 thereupon inserts the generated downstream node-to-node messages 400 into TDM channel Y 329 and combines the component TDM channels (in our example, W 309, X 319, Y 329 and Z 339) and sends out the resulting OSC message traffic 300 in digital form as downstream OSC data streams along the corresponding downstream digital data cables 289, 290 for subsequent processing by the downstream digital signal processors 281, 282, the OSC laser encoders 283, 284 and the downstream WDM filters 235, 236. Thus the generated downstream node-to-node message 400 is transmitted as part of the downstream WDM signal along the corresponding downstream WDM signal segments 254, 255.

The second TDM channel, in the example of FIG. 3 designated channel Z 339, is reserved for the exchange of node connectivity data messages 600, 610 which pass between the CNM 123 and individual nodes 101–122. This exchange is initiated by the CNM 123 by the issue of a connectivity request message 600, shown in exemplary form in FIG. 6(*a*).

This second channel provides an opportunity for the overall connectivity of the network 100 to be determined from a correlation, at a higher level, of the network connectivity of each node 101–122.

The connectivity request message 600 consists of a single field bearing a request code which is usually selected to be different from all identifies used in conventional OSC messages. The CNM 123 transmits the connectivity request message 600 to the node 101 with which it is connected by the communication link 124. The node 101 in turn inserts the connectivity request message 600 into TDM channel Z 339 of the OSC and circulates the message along its downstream WDM signal segments 254, 255 in conventional fashion. When the connectivity request message 600 is received by the node 101, it is acted upon as in the case of all other nodes 102–122 as described below and then the message is removed from TDM channel Z 339, in accordance with the dictates of the particular public protocol chosen.

As the connectivity request message 600 is encountered by each node 101–122 in the network 100 in turn, each node generates zero or more node connectivity report messages 610 along TDM channel Z for circulation along the WDM network 100 and eventual retrieval by node I 101 on behalf of the CNM 123. A node connectivity report message 610 is generated by a node 230 for each different upstream node-to-node message 400 it has received.

The format of the node connectivity report message 610 is shown in exemplary form in FIG. 6(*b*). The node connectivity message 610 contains a message identifier field 611, a reporting node field 612, an upstream node field 613 and n wavelength fields 614–619.

The message identifier field 611 identifies the message as a node connectivity message 610 generated by one of the nodes 101–122 in the network 100.

The reporting node field 612 contains the identity of the node 101–122 generating the node connectivity message 610.

The upstream node field 613 contains the identity of the node 293, 294 which is immediately upstream from the reporting node 230 and from which the upstream node-to-node message 400 which is being reported to the CNM 123 originated.

Each of the n wavelength fields 614–619 contain the identity of the node 101–122 which is the source of the payload signal which modulates each potential wavelength along the upstream WDM signal segment 237, 238 to which the upstream node-to-node message 400 is being reported to the CNM 123 applies. It is assumed, for illustrative purposes that there are only 6 possible wavelengths in the WDM signal. Thus there are 6 such payload source fields. The source of a payload signal is the identity of the node 101–122 which added the particular payload signal.

The configuration of each of the node connectivity reports 610 generated by a node 101–122 may be obtained from the most recently received corresponding upstream node-to-node messages 400 stored by the OSC processor 280 of the node as described above. More particularly, the contents of fields 613–619 correspond identically to the contents of fields 401–407 of the most recent copy of the corresponding upstream node-to-node message 400 and the contents of field 612 is the identity of the current node 101–122.

Figures 7A, 7B:
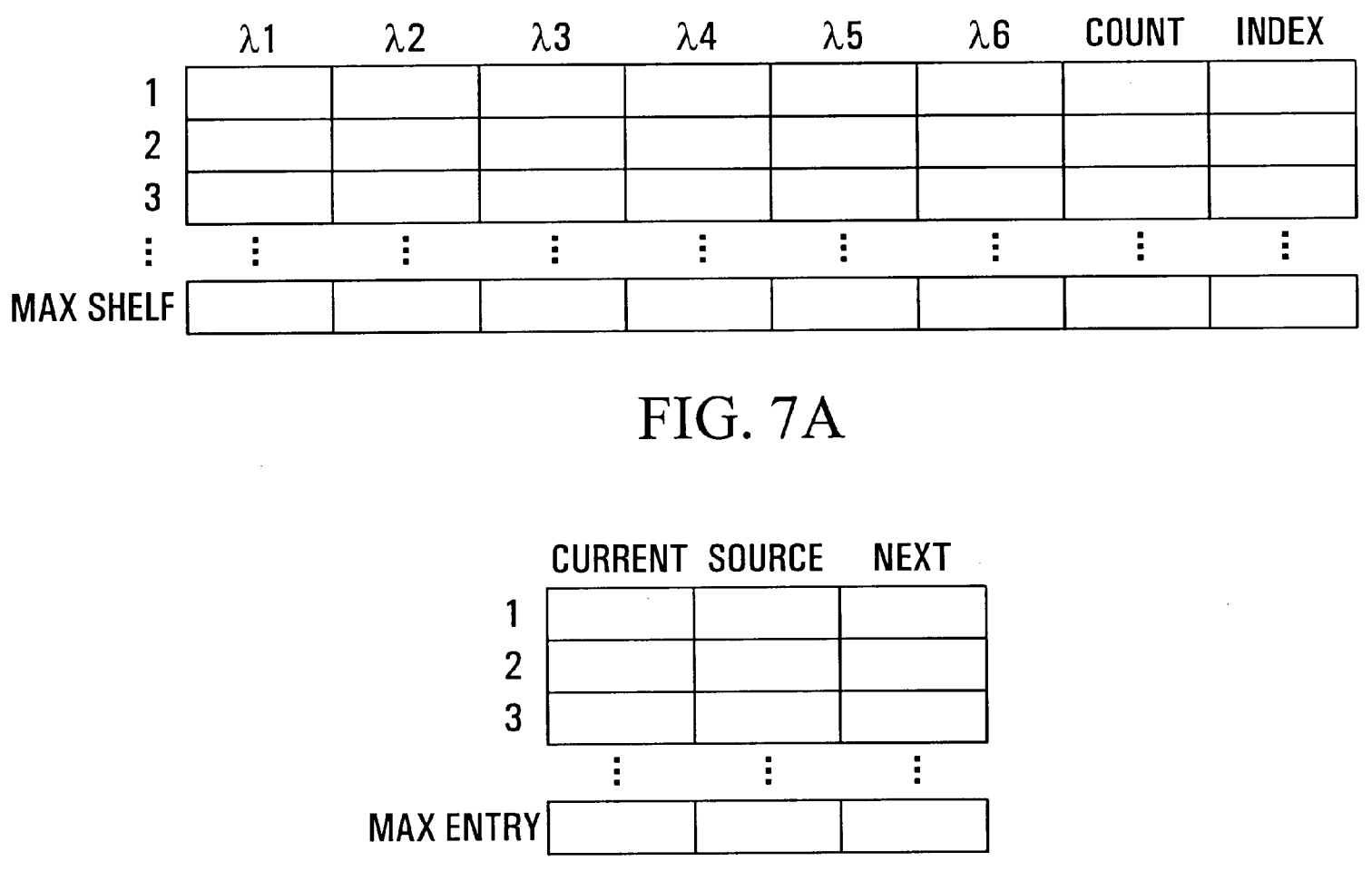

The format of the data structures used to maintain the network connectivity data at the CNM 123 is shown in exemplary form in FIGS. 7(*a*) and (*b*) respectively. FIG. 7(*a*) describes a data memory in the form of a data matrix. It will be recognized that the structures described are illustrative only and there may exist other data structures for achieving the same objective.

FIG. 7(*a*) comprises a two dimensional plane of a three-dimensional matrix designated matrix "A". The matrix "A" has 8 columns and MaxNode rows and a depth of MaxLink entries, where MaxNode is a number which is greater than the maximum number of nodes in the network under consideration and MaxLink is a number which is greater than the maximum number of signals which can modulate the same wavelength on different segments in the network.

In the discussion herein, for simplicity of explanation, the value of MaxLink is set to be a number which is greater than the maximum number of segments in the network. It will be recognized by those skilled in this art that a smaller value of MaxLink may be used without significant degradation of performance or increase in complexity. It will also be understood that different data structures than that of the matrix "A" and the two-dimensional plane shown in FIG. 7(*a*) may be chosen, being known in this art and need not be therefore described. Moreover, or alternatively, data compression techniques may be applied in a manner known to those skilled in this art.

FIG. 7(*a*) comprises a two dimensional plane of Matrix "A" having 8 columns and MaxNode rows, corresponding to a particular network segment. There is one row of entries for each node in the network. The first six columns of the matrix are designated "$\lambda 1$"–"$\lambda 6$" respectively. Each entry under one of these columns corresponds to the source of the payload signal which modulates the corresponding wavelength for the corresponding node. The seventh column, designated "Count", contains the number of nodes directly connected downstream from the corresponding node. The eighth column, designated "Index", is a pointer to an entry in the second matrix described below which identifies the first node which is directly connected downstream from the corresponding node.

FIG. 7(*b*) comprises a two dimensional matrix designated "B" having 3 columns and MaxEntry rows, where MaxEntry is a number which is greater than the maximum number of entries to be maintained by the CNM 123. Each row is capable of identifying a node which is directly connected downstream from a source node. The first column, designated "Current", contains the node identifier for the node which has been identified as being directly connected downstream from its source node. The second column, designated "Source", contains the node identifier for the source node with which the current node is directly connected downstream. The third column, designated "Next", identifies, if applicable, an entry in matrix B corresponding to a further node which is directly connected downstream from the same current node.

Figure 8A:
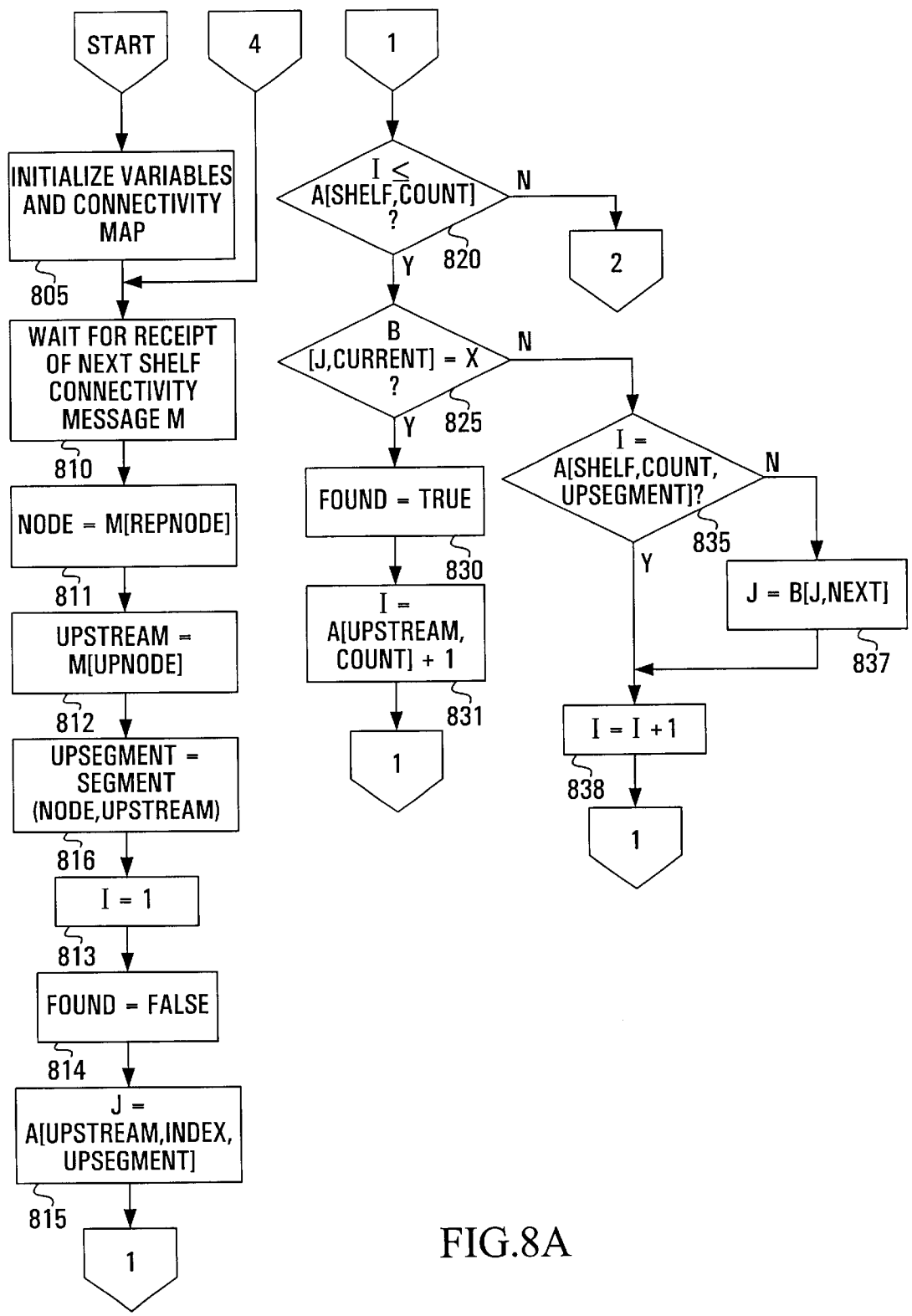
FIGS. 8a–8b are flow charts of the logical steps taken by the CNM to process the node connectivity data received from each node in the network in accordance with an embodiment of the present invention.
Figure 8B:
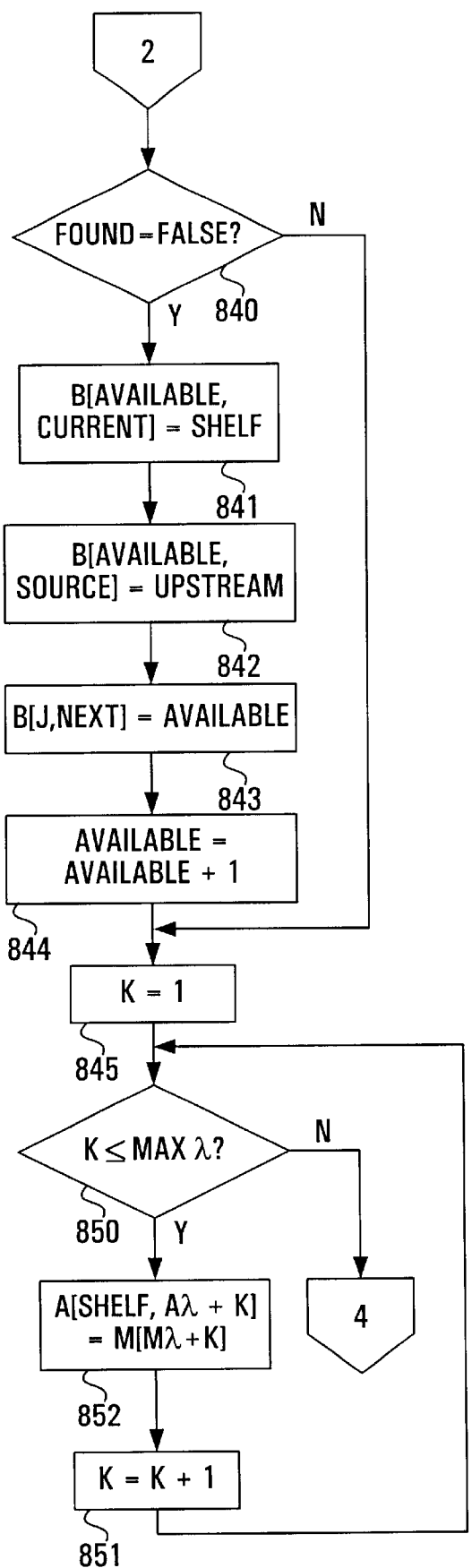

FIG. 8 sets out in flow chart form the logical steps taken by the CNM 123 in the preferred embodiment in processing the node connectivity reports 610 which it receives from nodes 101–122 in the network 100 to generate and maintain an up-to-date map of the topology and connectivity of the network 100. It will be recognized that the steps and their particular order are illustrative only and there may exist other algorithms for achieving the same objective.

Periodically, an alignment audit will be conducted in which the connectivity map as then constituted is saved and completely erased. As the connectivity map is thereafter regenerated, any discrepancies which reflect the existence of a fault or a reprovisioning will become apparent and can be processed.

Initially, a number of variables are initialized 805. These include the two matrices A and B each element of which is initialized to values which signify that they are unused. In addition, certain state variables used during the course of the connectivity processing are initialized. The index variables Node and Upstream, which contain node numbers and correspond to the row number of entries in matrix A, are initialized to values which signify that they are unused. The index variables, Last, Available and J, which contain values corresponding to the row number of entries in the matrix B are also set to values which signify that they are unused.

After initialization, the CNM 123 waits 810 for the receipt of the next node connectivity report message (designated "M") 610 generated by a node 230. Upon receipt, the CNM 123 assigns to index variable Node the value contained in the "Rep. Node" field of the message M 811. This variable thus contains the node identifier for the node which generated the message M (the "current node").

The CNM 123 then assigns to index variable Upstream the value contained in the "Up. Node" field of the message M 812. This variable thus contains the node identified for the node immediately upstream of the node which generated the message M, designated the "upstream node".

The CNM 123 thereupon determines the identity of the segment passing between the upstream node and the reporting node. This is shown in FIG. 8 as being performed by a lookup function SEGMENT 816.

The CNM 123 then initializes 813 the counter variable I to 1 and initializes 814 the boolean variable Found to FALSE. The CNM 123 then assigns to the index variable J, the value contained in matrix A in the column designated "Index" (the "index column") for the row for the node whose node identifier is contained in Upstream (the "upstream node row") and the entry corresponding to the segment along which the signal arrived 815. This element identifies the row of the entry in matrix B which contains the first of the nodes identified as being connected directly downstream (the "downstream nodes") from the upstream node.

The CNM 123 then processes the entry in matrix B in the row identified by index variable J (the "current entry") 825. If the Current field in the current entry contains the node identifier for the current node, then the connectivity between the upstream node and the current node has been previously identified and the boolean variable Found is set to "TRUE" 830. To prevent further processing along matrix B, the counter variable I is set to a value greater than the number of nodes previously identified as being connected directly downstream from the upstream node (as denoted by the value in the seventh column designated "Count" in the row corresponding to the upstream node 831 (the "downstream node count").

If the Current field in the entry in matrix B in the row identified by index variable J does not contain the node identifier for the current node, the counter variable I is compared against the downstream node count 835. If the values are equal, then all of the previously identified downstream nodes have been compared and found not to include the current node.

If the values are not equal, then the index variable J is set equal to the index contained in the Next column of the current entry in matrix B, which identifies the next entry in matrix B to be considered and makes it the new current entry 837.

Whether or not all of the previously identified downstream nodes have been compared, the counter variable I is incremented 838 by 1. Then the counter variable I is compared against the downstream node count 820. If the variable I is less than or equal to the downstream node count, the processing described above is repeated.

If not, the boolean variable Found is considered to determine whether the connectivity between the upstream node and the current node has been previously identified 840. If the variable is FALSE, no such connectivity has been identified and must be recorded. This is accomplished by completing the fields of the next available entry in matrix B, which is identified by the value of the index variable Available. The Current field in that entry is assigned the current node 841 and the Source field in that entry is assigned the upstream node 842. Then the Next field of the current entry (which corresponds to the last identified downstream node) is set equal to the index variable Available 843, so that subsequent searches of this node will consider the newly added downstream node and the index variable Available is incremented by 1 to the next available entry 844.

Whether or not the connectivity was previously recorded or is newly recorded, the next step is to update the source identifiers for each wavelength for the current node. The CNM 123 accomplishes this by initializing 845 the counter variable K to 1, progressively incrementing 851 the counter variable by 1 after processing and comparing the counter variable K against the maximum number of wavelengths handled in the network (designated "Max$\lambda$") 850, only processing if the counter variable K is less than or equal to Max$\lambda$. The processing performed consists of assigning to the Kth wavelength field in the row of matrix A corresponding to the current node, the value of the Kth wavelength field in the message M 852. This may be accomplished using constants A$\lambda$ and M$\lambda$ which correspond to the appropriate constant offset to be added to the index variable K to reach the appropriate wavelength field in matrix A and message M respectively.

Once all of the wavelength source identifiers have been recorded, the processing of the message M has been completed and the CNM waits 810 for the receipt of the next node connectivity report message 610 generated by a node 230.

It will be appreciated by those skilled in this art that the foregoing embodiment will provide topology and connectivity data regarding the network 100 to the CNM 123, but on a theoretical basis only. Each node connectivity report 610 generated by a node 230 reflects only what topology and connectivity data has been reported to it by upstream nodes 293, 294. While, as has been shown, certain error conditions may be detected using this information, the possibility that the data reported by one or more upstream nodes 293, 294 has been corrupted by a fault in a segment 125–145 or a node 101–122, while expected to be rare, cannot be discounted. Such an event would not necessarily be detected, but would result in corruption of downstream node connectivity messages 610. This would cascade to subsequent nodes and the connectivity messages would become completely unbelievable.

A second embodiment incorporating the features of this first embodiment disclosed above provides additional functionality by comparing the theoretical topology and connectivity data provided by the first embodiment through the out-of-band data disseminated along the OSC, with the actual connectivity of the network 100 using in-band data which modulates the payload data modulating the payload-bearing WDM wavelengths $\lambda 1$–$\lambda n$. In this fashion, any faults in nodes 101–122 or segments 125–145 which lead to corruption of node connectivity messages 610 will be identified and in many circumstances isolated.

Figure 9A:
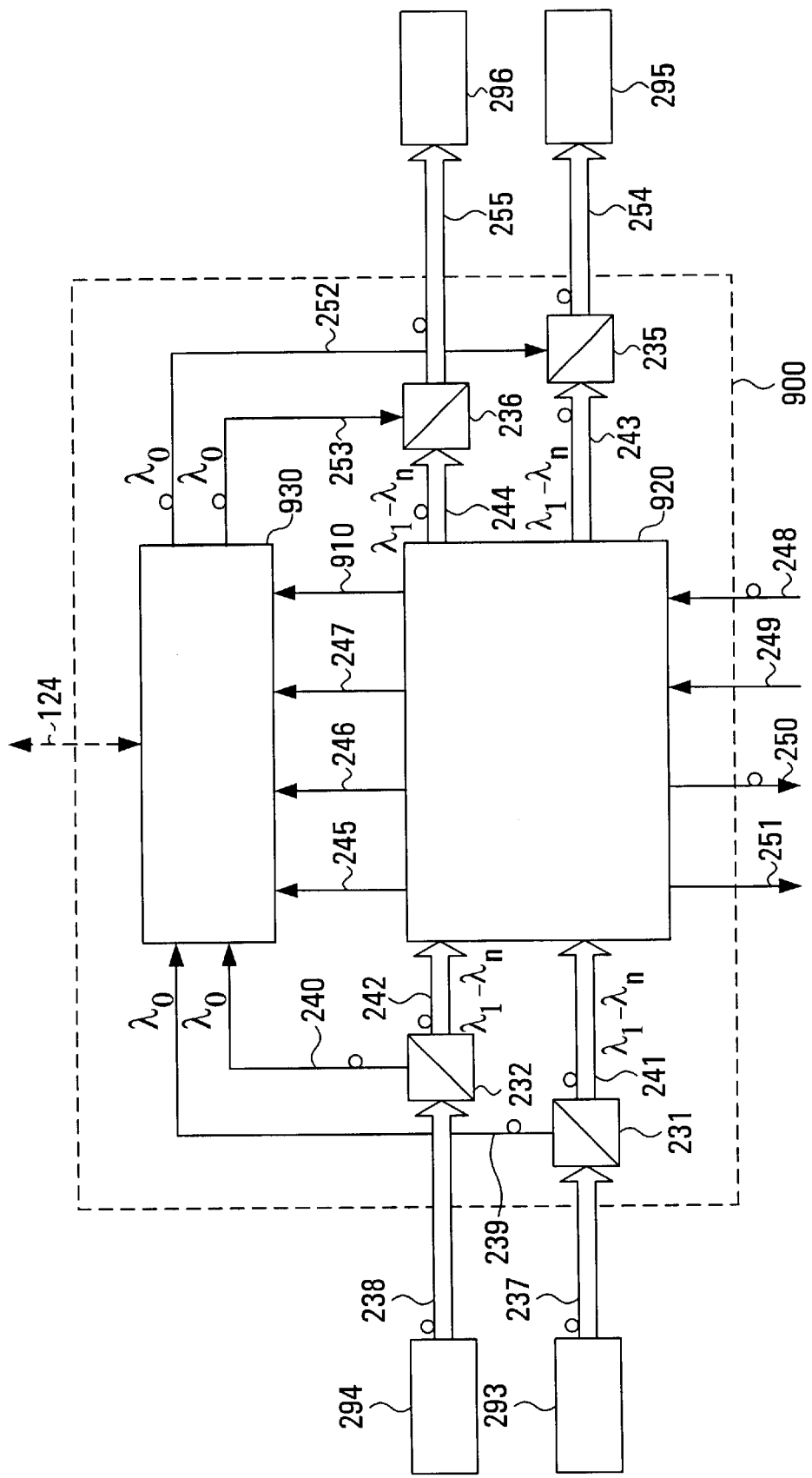
FIG. 9(a) is a block diagram of a typical node in a WDM network in accordance with a second embodiment of the present invention.

A block diagram of a typical node 900 according to this second embodiment is shown in FIG. 9(*a*). The node 900 is identical to the node 230 of the first embodiment according to the present invention, but with the addition of an in-band data signal line 910 passing from the payload processor 920 to the OSC processing subsystem 930.

Figure 9B:
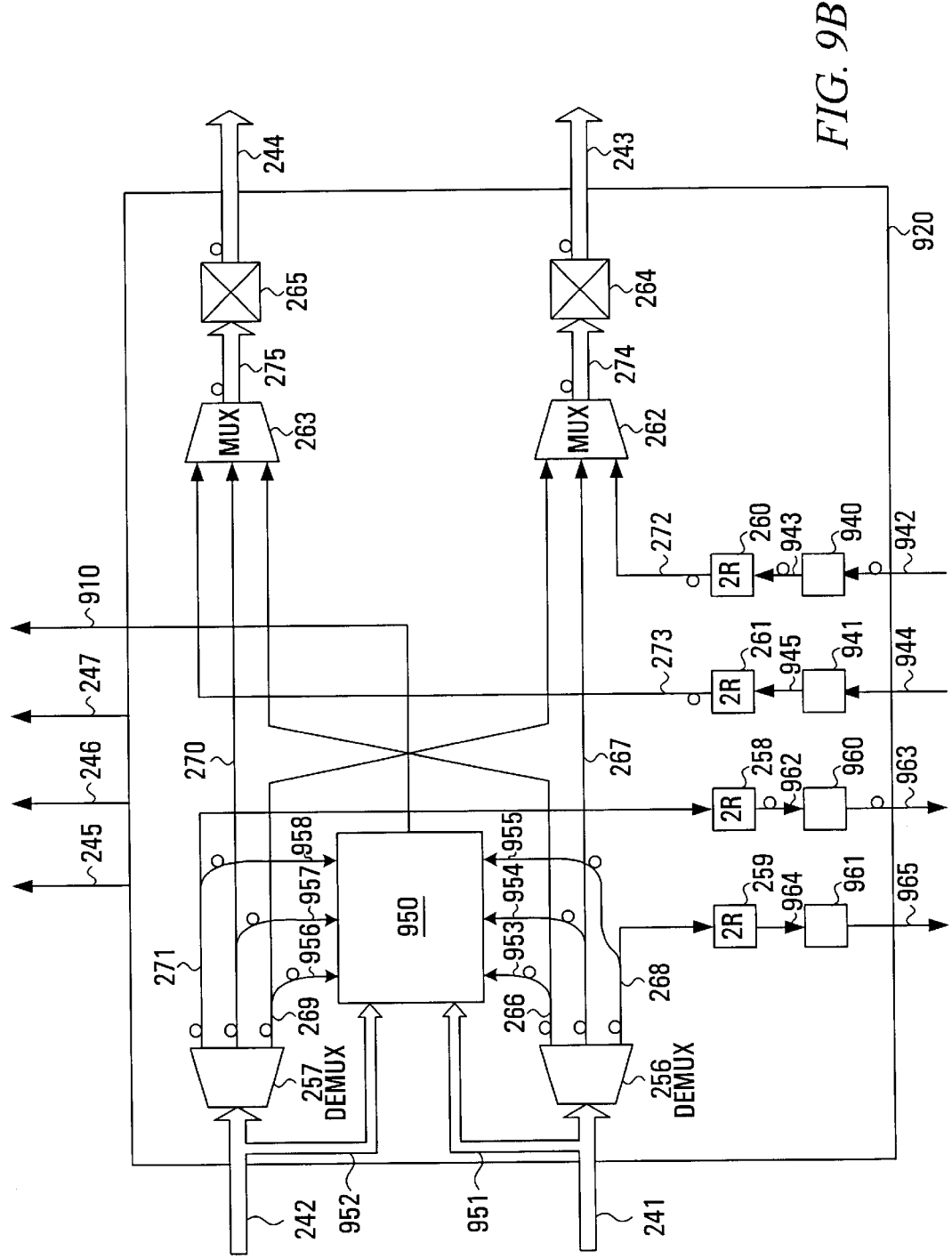
FIG. 9(b) is a block diagram of the payload processor shown in FIG. 9(a) whereby a modulating in-band signal to convey source and wavelength identification data is applied, monitored and removed from payload signals in accordance with the second embodiment of the present invention

The payload processor 920 is shown in greater detail in the block diagram of FIG. 9(b) and differs only slightly from the payload processor 230 of the first embodiment according to the present invention. In addition to the zero or more of each of an optical demultiplexer 256, 257, a 2R (optical) off-ramp 258, a 2R (electrical) off-ramp 259, a 2R (optical) on-ramp 260, a 2R (electrical) on-ramp 261, an optical multiplexer 262, 263 and an optical amplifier 264, 265 which may be found in a payload processor 230, the payload processor 920 of the second embodiment also comprises an in-band modulation monitor 950 and zero or more of each of an in-band signal modulator 940, 941 and an in-band signal demodulator 960, 961.

There is one in-band signal modulator 940, 941 for each 2R (optical) on-ramp 260 and each 2R (electrical) on-ramp 261 in the payload processor 920. The in-band signal modulator 940 is interposed between one of the LTEs 150–183 and the 2R (optical) on-ramp 260 and connected to them by, respectively, signal lines 942 and 943 which are optical fibres. The in-band signal modulator 941 is interposed between one of the LTEs 150–183 and the 2R (electrical) on-ramp 261 and connected to them by, respectively, signal lines 944 and 945, which are electrical cables. The in-band signal modulator 940, 941 modulates the payload signal arriving from the corresponding LTE 150–183 along the signal line 942, 944 extending between them with an in-band modulation signal comprising in-band connectivity data and transmits the modulated payload signal to the 2R (optical) on-ramp 260 or the 2R (electrical) on-ramp 261, as the case may be, along the signal line 943, 945 extending between them.

There is one in-band signal demodulator 960, 961 for each 2R (optical) off-ramp 258 and each 2R (electrical) off-ramp 259 in the payload processor 920. The in-band signal demodulator 960 is interposed between the 2R (optical) off-ramp 258 and one of the LTEs 150–183 and connected to them by, respectively, signal lines 962 and 963 which are optical fibres. The in-band signal demodulator 961 is interposed between the 2R (electrical) off-ramp 259 and one of the LTEs 150–183 and connected to them by, respectively, signal lines 964 and 965, which are electrical cables.

The in-band signal demodulator 960 extracts by demodulation the in-band connectivity data from the payload signal arriving from the corresponding 2R (optical) off-ramp 258 along the signal line 962. The in-band signal demodulator 961 extracts by demodulation the in-band connectivity data from the payload signal arriving from the corresponding 2R (electrical) off-ramp 259 along the signal line 964. The in-band connectivity data is reported to the CNM 123 for use in internal path fault correlation and the unmodulated payload signal is transmitted to the corresponding LTE 150–183 along the signal line 963, 965.

The in-band connectivity data identifies, at a minimum the source of the payload signal, that is, the identity of the node 101–122 which added the payload signal. It may also identify the WDM carrier wavelength which is modulated by the payload signal. Those skilled in this art will recognize that the in-band connectivity data may also identify other data which may be useful for OAM functions.

Thus, the in-band connectivity data is applied to each payload signal by the payload processor 920 for the node 900 at which the payload signal is being introduced to the network 100, that is, at the source of the payload signal.

There are two alternative methods of encoding connectivity data in-band about the payload data carried along the network 100. Either or both of these methods may be applied across the network 100.

The first method, known in the art as channel trace, comprises intensity amplitude modulating the payload data with a medium low bit rate (1–64 kbit/s) data signal which constitutes the in-band connectivity data to be transmitted. The in-band connectivity data which is encoded using the channel trace method can be detected when there is a single wavelength present in the signal being examined, without demodulation, by means of envelope detection.

The channel trace method of modulating payload signals with in-band connectivity data has the advantage of a relatively high data bit rate and the ability of directly encoding the connectivity data. The disadvantage of this method is that the WDM signal must be demodulated at each node in order to monitor the in-band connectivity data. Thus, even where a node neither adds nor removes signals, optical demultiplexers 256, 257 and optical multiplexers 262, 263 would be required, thus entailing additional expense.

The second method makes use of a low bit rate (on the order of 1–10 bits/s) data channel which is also realized by intensity amplitude modulating the payload signal, but where the modulation signals (called Wave IDs) are designed to be orthogonal such that the Wave IDs may be independently detected even in a WDM signal comprising a plurality of wavelengths. This method can embed a unique channel identifier which defines the connectivity data for the payload signal. The Wave ID method is described in U.S. Pat. No. 6,574,016 "Method and Apparatus for Ancillary Data in a Wavelength Division Multiplexed System" by Harley et. al.

The Wave ID method of modulating payload signals with in-band connectivity data has the advantage of being able to monitor the in-band connectivity data thus encoded without requiring the payload signals to be demultiplexed. The disadvantages of this method include the very low data bit rate and the inability to directly encode the connectivity data. Rather, the encoded data is an identifier which constitutes a code representing a datum of connectivity data.

The in-band modulation monitor 950 monitors the connectivity of the various payload signals processed by the payload processor 920 of the node 900 of the second embodiment. It is connected by taps of optical fibres passing through the payload processor 920. Depending upon the modulation method used to encode the in-band connectivity data, the taps may be applied to the upstream WDM signal segments 241, 242 or to the forwarded WDM modulated signal segments 266, 267, 269, 270 and the removed WDM modulated signal segments 268, 271.

Where the channel trace method of modulating the payload signals with in-band connectivity data is used, the taps 953–958 are applied to each forwarded WDM modulated signal segment 266, 267, 269, 270 and each removed WDM modulated signal segment 268, 271 in the payload processor 920 of the node 900 of the second embodiment.

Where the Wave ID method of modulating the payload signals with in-band connectivity data is used, the taps 951, 952 are applied to each upstream WDM signal segment 241, 242 entering the payload processor 920 of the node 900 of the second embodiment.

Additionally, the in-band modulation monitor 950 is connected to the OSC processor 280 by the in-band signal data line 910. The in-band modulation monitor 950 monitors the in-band connectivity data of the payload signals entering the payload processor 920 of the node 900 of the second embodiment and transmits this in-band connectivity data to the OSC processor 280 along the in-band signal data line 910.

Figure 9C:
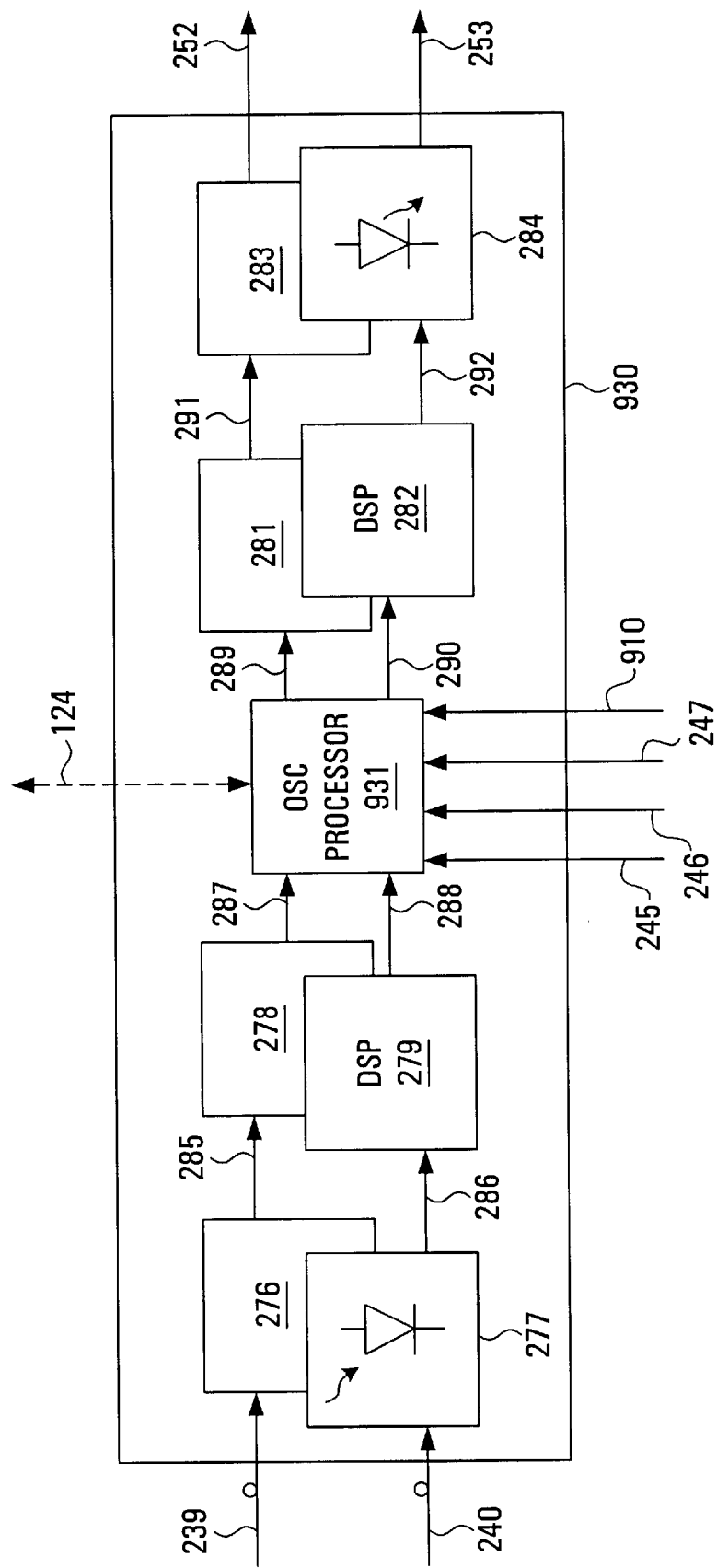
FIG. 9(c) is a block diagram of the OSC processing subsystem shown in FIG. 9(a) whereby the source and wavelength identification in-band data monitored by the payload processor is compared against the node connectivity data generated by the OSC processing subsystem in accordance with the second embodiment of the present invention.

A block diagram of the OSC processing subsystem 930 used in the node 900 of the second embodiment is shown in FIG. 9(c). It differs only from the OSC processing subsystem 234 used in the node 230 of the first embodiment by the connection of the OSC processor 931 from the in-band modulation monitor 950 along the in-band signal data line 910.

The OSC processor 931 receives in-band connectivity data from the in-band modulation monitor 950 along the in-band signal data line 910 and compares this data with the corresponding upstream node connectivity data received from the corresponding upstream node 293, 294 in the form of the corresponding upstream node-to-node message 400. Where a portion of the in-band connectivity data obtained from the in-band modulation monitor 950 does not correspond to the corresponding portion of the upstream node connectivity data obtained from the upstream node 293, 294 in the form of the corresponding upstream node-to-node message 400, the OSC processor 931 reports an error message. In the preferred embodiment, the error message is reported as a conventional alarm raised by the node 900 and directed to the CNM 123 along TDM channel X 319 in conventional fashion. The CNM 123 therefore indicates an alarm condition at the point in question in the connectivity map which it maintains.

In the present invention, the additional functions for which the CNM 123 is responsible in this embodiment are accomplished or a fault isolator processor (not shown) which may be a hardware circuit, a software processor operation within the CNM 123 or a combination thereof. Those familiar with this aret or appreciate that the fault isolator processor may optionally incorporate in hardware and software dents outside the CNM 123.

It will be appreciated by those skilled in this art that various modifications and variations may be made to the system described herein consistent with the present invention without departing from the spirit and scope of the invention. Other embodiments of the invention will be apparent to those skilled in this art from consideration of the specification and practice of the invention disclosed herein.

It is intended that the specification and examples be considered exemplary only, the true scope and spirit of the present invention being indicated by the following claims.

I claim:

1. A wavelength division multiplexed (WDM) network having a plurality of network nodes interconnected by WDM compatible optical fibre segments which carry a plurality of WDM compatible wavelengths capable of being modulated by signals, comprising:
   a configuration propagation system for propagating configuration data of each network node along the network, the configuration data of a network node comprising data identifying at which node an in-band signal modulating each wavelength was introduced to the network;
   a mapping processor for monitoring and processing the configuration data of each network node, whereby the configuration for the entire network may be determined;
   a fault propagation system for propagating fault data along the network; and
   a fault processor for monitoring and processing the fault data of each network node whereby faults in the network may be identified and isolated.

2. A WDM network according to claim 1 wherein the configuration data of a network node comprises data identifying those network nodes directly connected to it.

3. A WDM network according to claim 1 wherein the configuration propagation system comprises:
   a configuration signal containing the configuration data for modulating a WDM compatible configuration wavelength reserved throughout the network; and
   configuration signal processors associated with each network node for generating configuration data specific to its associated network node and inserting the generated configuration data along the configuration signal.

4. A WDM network according to claim 1 wherein the fault data comprises data identifying inconsistencies between the configuration data of each network node and identification data modulating the in-band signals which modulate each wavelength arriving at of each network node.

5. A WDM network according to claim 1 wherein the mapping processor and the fault processor are the same.

6. For use in a WDM network having a plurality of network nodes interconnected by WDM compatible optical fibre segments which carry a plurality of WDM compatible wavelengths capable of being modulated by signals, a configuration signal processor associated with at least one of the network nodes for generating configuration data, and a mapping processor for determining the configuration of the entire network,
   a configuration signal containing the configuration data including node-to-node messages identifying at which node an in-band signal modulating each wavelength was introduced to the network and reporting messages containing configuration data for receipt by the mapping processor, for modulating a WDM compatible configuration wavelength reserved throughout the network,
   whereby the configuration signal processor of a network node may insert configuration data into the configuration signal and the mapping processor may retrieve the configuration data from the configuration signal and determine the configuration of the entire network.

7. A configuration signal according to claim 6 further comprising node-to-node messages containing configuration data generated by the configuration signal processor of a network node, for receipt by each of the downstream configuration signal processors.

8. A configuration signal according to claim 7 wherein the node-to-node messages occupy at least one designated time division multiplexed channel of the configuration signal.

9. A configuration signal according to claim 6 wherein the reporting messages occupy at least one designated time division multiplexed channel of the configuration signal.

10. A configuration signal according to claim 6 wherein the reporting messages are generated by the configuration signal processor for a network node upon receipt by the configuration signal processor of a request message within the configuration signal.

11. A configuration signal according to claim 10 wherein the request message is generated periodically.

12. For use in a WDM network having a plurality of network nodes interconnected by WDM compatible optical fibre segments which carry a plurality of WDM compatible wavelengths capable of being modulated by signals, a configuration signal processor associated with at least one of the network nodes for generating configuration data including node-to-node messages identifying at which node an in-band signal modulating each wavelength was introduced to the network, and a configuration signal containing configuration data for modulating a WDM compatible configuration wavelength reserved throughout the network,
   a mapping processor for retrieving and processing the configuration data for each network node from the configuration signal, whereby the configuration for the entire network may be determined.
      wherein the mapping processor generates a request message for receipt in turn by at least one of the configuration signal processors; and
      upon receipt of the request message, each configuration signal processor generates reporting messages containing configuration data for receipt by the mapping processor.

13. A mapping processor according to claim 12 further comprising a central network monitor.

14. For use in a WDM network having a plurality of network nodes interconnected by WDM compatible optical fibre segments which carry a plurality of WDM compatible wavelengths capable of being modulated by signals, a fault signal containing fault data for modulating a WDM compatible fault wavelength reserved throughout the network, and a fault isolation processor for monitoring and processing the fault data of each network node,
   a fault processor associated with a network node for generating fault data and inserting the fault data into the fault signal, the fault processor comprising a signal processor for comparing identification data modulating the in-band signals which modulate each wavelength arriving at its corresponding network node with configuration data reported by an upstream network node,
   whereby the fault isolation processor may retrieve the fault data for each network node from the fault signal and isolate faults in the entire network.

15. A fault processor according to claim 14 wherein the fault data generated is specific to its associated network node.

16. A fault processor according to claim 14 further comprising a signal processor for inserting the fault data of its corresponding network node into at least one fault signal network node.

17. A method of determining the configuration of a WDM network having a plurality of network nodes interconnected by WDM compatible optical fibre segments which carry a plurality of WDM compatible wavelengths capable of being modulated by signals and a mapping processor, comprising the steps of:
   at least one of the nodes determining its configuration by:
      receiving configuration information from an upstream node;
      modifying the configuration information to account for its effect thereon; and
      transmitting the modified configuration information to a downstream node;
         wherein the configuration information occupies a first time division multiplexed channel which is modulated about a WDM compatible configuration wavelength;
   each of the at least one nodes reporting its configuration data to the mapping processor; and
   the mapping processor determining the overall configuration of the network from the configuration data received from the at least one nodes.

18. The method according to claim 17, wherein the at least one node receives the configuration information modulated about a WDM compatible configuration wavelength.

19. The method according to claim 17, wherein the step of receiving the configuration information is performed by a configuration signal processor associated with the node.

20. The method according to claim 17, wherein the step of modifying the configuration information is performed by a configuration signal processor associated with the node.

21. The method according to claim 17, wherein the step of transmitting the modified configuration information is performed by a configuration signal processor associated with the node.

22. The method according to claim 17, wherein the step of the mapping processor determining the overall configuration further comprises the steps of:
   the mapping processor receiving configuration data from the at least one nodes; and
   the mapping processor calculating the overall configuration of the network from the received configuration data.

23. The method according to claim 17, further comprising the steps of:
   the at least one node receiving identification data identifying the source of in-band signals modulated about the WDM compatible wavelengths received along an upstream segment;
   the at least one node comparing the identification data with the configuration information received from the upstream segment; and
   the at least one node transmitting an alarm message to denote an inconsistency between the identification data and the configuration information.

24. The method according to claim 23, wherein the identification data modulates the in-band signal it identifies.

25. The method according to claim 23, wherein the step of receiving identification data is performed by a fault processor associated with the node.

26. The method according to claim 23, wherein the step of comparing identification data is performed by a fault processor associated with the node.

27. The method according to claim 23, wherein the step of transmitting an alarm message is performed by a fault processor associated with the node.

28. The method according to claim 23, wherein the alarm message is received by a fault isolation processor.

29. The method according to claim 23, wherein the alarm message occupies a third time division multiplexed channel of the configuration wavelength.

30. A method of determining the configuration of a WDM network having a plurality of network nodes interconnected by WDM compatible optical fibre segments which carry a plurality of WDM compatible wavelengths capable of being modulated by signals and a mapping processor, comprising the steps of:
   at least one of the nodes determining its configuration by:
      receiving configuration information from an upstream node;
      modifying the configuration information to account for its effect thereon; and
      transmitting the modified configuration information to a downstream node;
   each of the at least one nodes reporting its configuration data to the mapping processor;
      wherein the configuration data occupies a second time division multiplexed channel which is modulated about a WDM compatible configuration wavelength; and
   the mapping processor determining the overall configuration of the network from the configuration data received from the at least one nodes.
   wherein the at least one node transmits its configuration data.

31. A method of determining the configuration of a WDM network having a plurality of network nodes interconnected by WDM compatible optical fibre segments which carry a plurality of WDM compatible wavelengths capable of being modulated by signals, comprising the steps of:

reserving one of the WDM compatible wavelengths along the network;

a first network node modulating the reserved wavelength on a fibre segment with which it is connected to a second network node with an out-of-band signal describing the in-band signals borne on the other wavelengths along the fibre segment;

the first network node transmitting the out-of-band signal together with the in-band signals along the fibre segment from the first node to the second node; and the second network node reviewing the out-of-band signal received alone the fibre segment and determining what in-band signals were transmitted along the fibre segment further comprising the steps of:

the second network node comparing the out-of-band signal information with the in-band signals received along the fibre segment; and the second network node generating an alarm if the in-band signals do not correspond with the out-of-band signal information.

32. A method of determining the configuration of a WDM network having a plurality of network nodes interconnected by WDM compatible optical fibre segments which carry a plurality of WDM compatible wavelengths capable of being modulated by in-band signals, a configuration signal containing configuration data for modulating a WDM compatible configuration wavelength reserved throughout the network, configuration signal processors associated with each network node for generating configuration data specific to its associated network node, and a mapping processor for determining the configuration of the entire network, comprising the steps of:

the mapping processor inserting a node-to-node message in the configuration signal;

the configuration wavelength propagating the node-to-node message in the configuration signal to each network node immediately downstream of the network node;

upon receipt of the node-to-node message in the configuration signal at a network node, the configuration signal processor associated with the network node:

retrieving the configuration data reported by the immediately upstream configuration signal processor from the node-to-node message in the configuration signal;

calculating the effect of its associated network node on the configuration data reported by the immediately upstream configuration signal processor;

formatting the configuration data of its associated network node into a node-to-node message; and inserting the node-to-node message into the configuration signal;

the mapping processor inserting a request message into the configuration signal;

the configuration wavelength propagating the request message in the configuration signal to each network node in the network in turn;

upon receipt of the request message in the configuration signal at a network node, the configuration signal processor associated with the network node:

generating a reporting message containing the configuration data of its associated network node; and inserting each reporting message into the configuration signal;

the configuration wavelength propagating the reporting messages in the configuration signal to the mapping processor; and upon receipt of one of the reporting messages in the configuration signal, the mapping means updating its network configuration data in accordance with the configuration data contained in the reporting message.

33. The method according to claim 32 in a WDM network also having a fault signal containing fault data for modulating a WDM compatible fault wavelength reserved throughout the network, fault processors associated with each network node for generating fault data specific to its associated network node, and a fault isolation processor for monitoring and processing the fault data of each network node, further comprising the steps of:

each network node modulating in-band signals which are added to the network by the network node by identification data before modulating the in-band signals about the wavelength;

upon receipt of the node-to-node message in the configuration signal at a network node, the configuration signal processor associated with the network node further:

comparing the identification data with the configuration data reported by the immediately upstream configuration signal processor in the node-to-node message;

calculating the effect of its associated network node on the configuration data reported by the immediately upstream configuration signal processor;

formatting the fault data of its associated network node into an alarm message; and inserting the alarm message into the fault signal;

the fault wavelength propagating the alarm messages in the fault signal to the fault isolation processor;

upon receipt of one of the alarm messages in the fault signal, the fault isolation processor updating its network fault is isolation data in accordance with the fault data contained in the alarm message; and each network node demodulating the identification data from the in-band signals which are removed from the network by the network node after demodulating the in-band signals from the wavelength.

* * * * *